(12) United States Patent
Chen et al.

(10) Patent No.: US 11,825,101 B2
(45) Date of Patent: Nov. 21, 2023

(54) JOINT-COMPONENT NEURAL NETWORK BASED FILTERING DURING VIDEO CODING

(71) Applicant: QUALCOMM Incorporated, San Diego, CA (US)

(72) Inventors: Jianle Chen, San Diego, CA (US); Hongtao Wang, San Diego, CA (US); Venkata Meher Satchit Anand Kotra, Munich (DE); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/493,543

(22) Filed: Oct. 4, 2021

(65) Prior Publication Data

US 2022/0109860 A1    Apr. 7, 2022

Related U.S. Application Data

(60) Provisional application No. 63/087,784, filed on Oct. 5, 2020.

(51) Int. Cl.
*H04N 19/00* (2014.01)
*H04N 19/186* (2014.01)
(Continued)

(52) U.S. Cl.
CPC ............ *H04N 19/186* (2014.11); *G06N 3/04* (2013.01); *G06N 3/10* (2013.01); *H04N 19/117* (2014.11); *H04N 19/176* (2014.11)

(58) Field of Classification Search
CPC .. H04N 19/186; H04N 19/117; H04N 19/176; G06N 3/04; G06N 3/10
See application file for complete search history.

(56) References Cited

U.S. PATENT DOCUMENTS

2020/0075148 A1* 3/2020 Nguyen ................. G06N 3/04

FOREIGN PATENT DOCUMENTS

EP         3706046 A1     9/2020

OTHER PUBLICATIONS

Bross B., et al., "Versatile Video Coding (Draft 10)", JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 551 Pages.

(Continued)

*Primary Examiner* — Zhihan Zhou
(74) *Attorney, Agent, or Firm* — Shumaker & Sieffert, PA

(57) ABSTRACT

An example device for decoding video data includes a memory configured to store video data; and one or more processors implemented in circuitry and configured to: apply a downsampling convolutional neural network layer to a first color component of a block of video data, the first color component of the block having a first size, wherein applying the downsampling convolutional neural network layer to the first color component generates a downsampled first color component having a second size smaller than the first size; filter a second color component having the second size to form a filtered second color component; concatenate the downsampled first color component with the filtered second color component to form concatenated color components; and filter the concatenated color components to form a filtered concatenated component including a filtered downsampled first color component.

29 Claims, 14 Drawing Sheets

(51) Int. Cl.
*H04N 19/117* (2014.01)
*G06N 3/10* (2006.01)
*G06N 3/04* (2023.01)
*H04N 19/176* (2014.01)

(56) References Cited

OTHER PUBLICATIONS

Bross B., et al., "Versatile Video Coding (Draft 9)," 130th MPEG Meeting, 18th JVET Meeting, Apr. 15, 2020-Apr. 24, 2020, Alpbach, (Motion Picture Expert Group or ISO/IEC JTC1/SC29/WG11 and JVET of ITU-T SG 16 WP 3 and ISO/IEC JTC 1/SC 29/WG 11), No. m53983, JVET-R2001-v8, May 6, 2020 (May 6, 2020), XP030287934, 524 pages, Retrieved from the Internet: URL: http://phenix.int-evry.fr/mpeg/doc_end_user/documents/130_Alpbach/wg11/m53983-JVET-R2001-v8-JVET-R2001-v8.zip JVET-R2001-v8.docx [retrieved on May 6, 2020].

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

Bross B., et al., "Versatile Video Coding (Draft 9)", 130. MPEG Meeting; Apr. 15, 2020-Apr. 24, 2020, Alpbach, (Motion Picture Expert Group or ISO/IEC JTC1/SC29/WG11), No. m53983, JVET-R2001, May 3, 2020 (May 3, 2020), XP030287933, 534 Pages, Retrieved from the Internet: URL: http://phenix.int-evry.fr/mpeg/doc_end_user/documents/130_Alpbach/wg11/m53983-JVET-R2001-v7-JVET-R2001-v7.zip JVET-R2001-v7.docx [retrieved on May 3, 2020].

Hsiao Y.L., et al., "CE10-1.2: Convolutional Neural Network Loop Filter", 15. JVET Meeting, Jul. 3, 2019-Jul. 12, 2019, Gothenburg, (The Joint Video Exploration Team of ISO/IEC JTC1/SC29/WG11 and ITU-SG.16), No. JVET-O0056, Jun. 18, 2019 (Jun. 18, 2019), XP030205589, 5 Pages, Retrieved from the Internet: URL: http://phenix.int-evry.fr/jvet/ doc_end_user/documents/15_Gothenburg/wg11 /JVET-O0056-v1.zip JVET-O0056-v1.docx [Retrieved on Jun. 18, 2019].

Hisiao Y-L., et al., "AHG9: Convolutional Neural Network Loop Filter", JVET-M0159-v1, 13th Meeting: Joint Video Experts Team (JVET) of ITU-T SG 16 WP 3 and ISO/IEC JTC 1/SC 29/WG 11, No. JVET-M0159, Jan. 9, 2019 (Jan. 9, 2019), XP030201009, Retrieved from the Internet: URL: http://phenix.int-evry.fr/jvet/doc_end_user/documents/13_Marrakech/wg11/JVET-M0159-v2.zip JVET-M0159-v1.docx [Retrieved on Jan. 9, 2019], Marrakech, MA, Jan. 9-18, 2019, pp. 1-6.

International Search Report and Written Opinion—PCT/US2021/053490—ISA/EPO—dated Feb. 10, 2022, 17 pp.

Li Y., et al., "AHG11: Convolutional Neural Networks-based In-Loop Filter", JVET-T0088, Joint Video Experts Team (JVET) of ITU-T SG 16 WP 3 and ISO/IEC JTC 1/SC 29, 20th Meeting, by Teleconference, No. JVET-T0088, Oct. 1, 2020 (Oct. 1, 2020), XP030293537, Retrieved from the Internet: URL: https://jvet-experts.org/doc_end_user/documents/20_Teleconference/wg11/JVET-T0088-v1.zip JVET-T0088.docx [retrieved on Oct. 1, 2020], Oct. 7-16, 2020, pp. 1-4.

"Test Model 5 of Versatile Video Coding (VTM 5)", 126. MPEG Meeting, Mar. 25, 2019-Mar. 29, 2019, Geneva, (Motion Picture Expert Group or ISO/IEC JTC1/SC29/WG11), No. N18371, Jul. 7, 2019 (Jul. 7, 2019), XP030222341, 77 Pages, Retrieved from the Internet: URL: http://phenix.int-evry.fr/mpeg/doc_end_user/documents/126_Geneva/wg11/ w18371.zip w18371.docx [Retrieved on Jul. 7, 2019].

Wan S., et al., "CE10: Integrated in-Loop Filter Based on CNN (Tests 2.1, 2.2 and 2.3)", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0079, Jun. 18, 2019 (Jun. 18, 2019), XP030205612, 6 Pages, Retrieved from the Internet: URL: http://phenix.int-evry.fr/jvet/doc_end_user/documents/15_Gothenburg/wg11/JVET-O0079-v1.zip JVET-O0079.docx [Retrieved on Jun. 18, 2019].

Wan S., et al., "CE13-related: Integrated in-loop Filter Based on CNN," 14. JVET Meeting, Mar. 19, 2019-Mar. 27, 2019; Geneva, (The Joint Video Exploration Team of ISO/IEC JTC1/SC29/WG11 and ITU-T SG.16), No. JVET-N0133, Mar. 17, 2019 (Mar. 17, 2019), XP030255212, 7 pages, Retrieved from the Internet: URL:http://phenix.int-evry.fr/jvet/doc_end_user/documents/14_Geneva/wg11/JVET-N0133-v2.zip JVET-N0133-v2.docx [retrieved on Mar. 17, 2019].

Wang Y., et al., "AHG9: Dense Residual Convolutional Neural Network based In-Loop Filter", 11. JVET Meeting, Jul. 11, 2018-Jul. 18, 2018, Ljubljana, (The Joint Video Exploration Team of ISO/IEC JTC1/SC29/WG11 and ITU-TSG.16). No. JVET-K0391, Jul. 14, 2018 (Jul. 14, 2018), XP030199771, 6 Pages, Retrieved from the Internet: URL: http://phenix.int-evry.fr/jvet/doc_end_user/documents/11_Ljubljana/wg11/JVET-K0391-v4.zip JVET-K0391-v4.docx [Retrieved on Jul. 14, 2018].

* cited by examiner

JOINT-COMPONENT NEURAL NETWORK BASED FILTERING DURING VIDEO CODING

This application claims the benefit of U.S. Provisional Application No. 63/087,784, filed Oct. 5, 2020, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for filtering decoded pictures, which may be distorted. The filtering process may be based on neural network techniques. The filtering process may be used in the context of advanced video codecs, such as extensions of ITU-T H.266/Versatile Video Coding (VVC), or subsequent generations of video coding standards, and any other video codecs.

In one example, a method of filtering decoded video data includes applying a downsampling convolutional neural network layer to a first color component of a block of video data, the first color component of the block having a first size, wherein applying the downsampling convolutional neural network layer to the first color component generates a downsampled first color component having a second size smaller than the first size; filtering a second color component having the second size to form a filtered second color component; concatenating the downsampled first color component with the filtered second color component to form concatenated color components; and filtering the concatenated color components to form a filtered concatenated component including a filtered downsampled first color component.

In another example, a device for filtering decoded video data includes a memory configured to store video data; and one or more processors implemented in circuitry and configured to: apply a downsampling convolutional neural network layer to a first color component of a block of video data, the first color component of the block having a first size, wherein applying the downsampling convolutional neural network layer to the first color component generates a downsampled first color component having a second size smaller than the first size; filter a second color component having the second size to form a filtered second color component; concatenate the downsampled first color component with the filtered second color component to form concatenated color components; and filter the concatenated color components to form a filtered concatenated component including a filtered downsampled first color component.

In another example, a computer-readable storage medium has stored thereon instructions that, when executed, cause a processor to apply a downsampling convolutional neural network layer to a first color component of a block of video data, the first color component of the block having a first size, wherein applying the downsampling convolutional neural network layer to the first color component generates a downsampled first color component having a second size smaller than the first size; filter a second color component having the second size to form a filtered second color component; concatenate the downsampled first color component with the filtered second color component to form concatenated color components; and filter the concatenated color components to form a filtered concatenated component including a filtered downsampled first color component.

In another example, a device for filtering decoded video data includes means for applying a downsampling convolutional neural network layer to a first color component of a block of video data, the first color component of the block having a first size, wherein applying the downsampling convolutional neural network layer to the first color component generates a downsampled first color component having a second size smaller than the first size; means for filtering a second color component having the second size to form a filtered second color component; means for concatenating the downsampled first color component with the filtered second color component to form concatenated color components; and means for filtering the concatenated color components to form a filtered concatenated component including a filtered downsampled first color component.

The details of one or more examples are set forth in the accompanying drawings and the description below. Other features, objects, and advantages will be apparent from the description, drawings, and claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), High Efficiency Video Coding (HEVC) or ITU-T H.265, including its range extension, multiview extension (MV-HEVC), and scalable extension (SHVC). Another example video coding standard is Versatile Video Coding (VVC) or ITU-T H.266, which has been developed by the Joint Video Expert TEAM (JVET) of ITU-T Video Coding Experts Group (VCEG) and ISO/IEC Motion Picture Experts Group (MPEG). Version 1 of the VVC specification, referred to as "VVC FDIS" hereinafter, is available from http://phenix.int-evry.fr/jvet/doc_end_user/documents/19_Teleconference/wg11/JVET-S2001-v17.zip.

Figure 1:
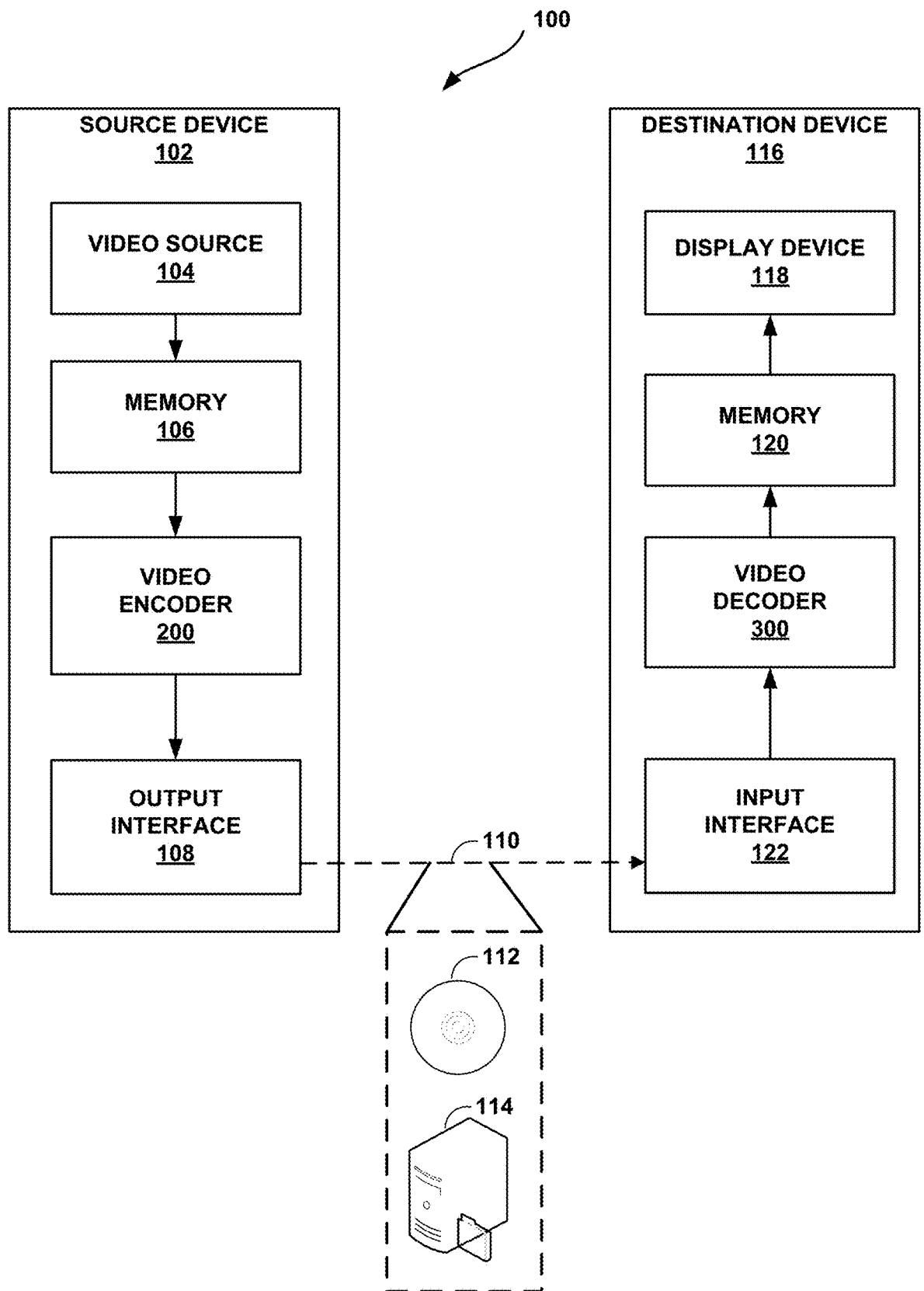
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for filtering video data using a joint-component neural network based filtering process. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for filtering video data using a joint-component neural network based filtering process. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as Versatile Video Coding (VVC). A draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting:, 15-24 April, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. The component may be an array or single sample from one of three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
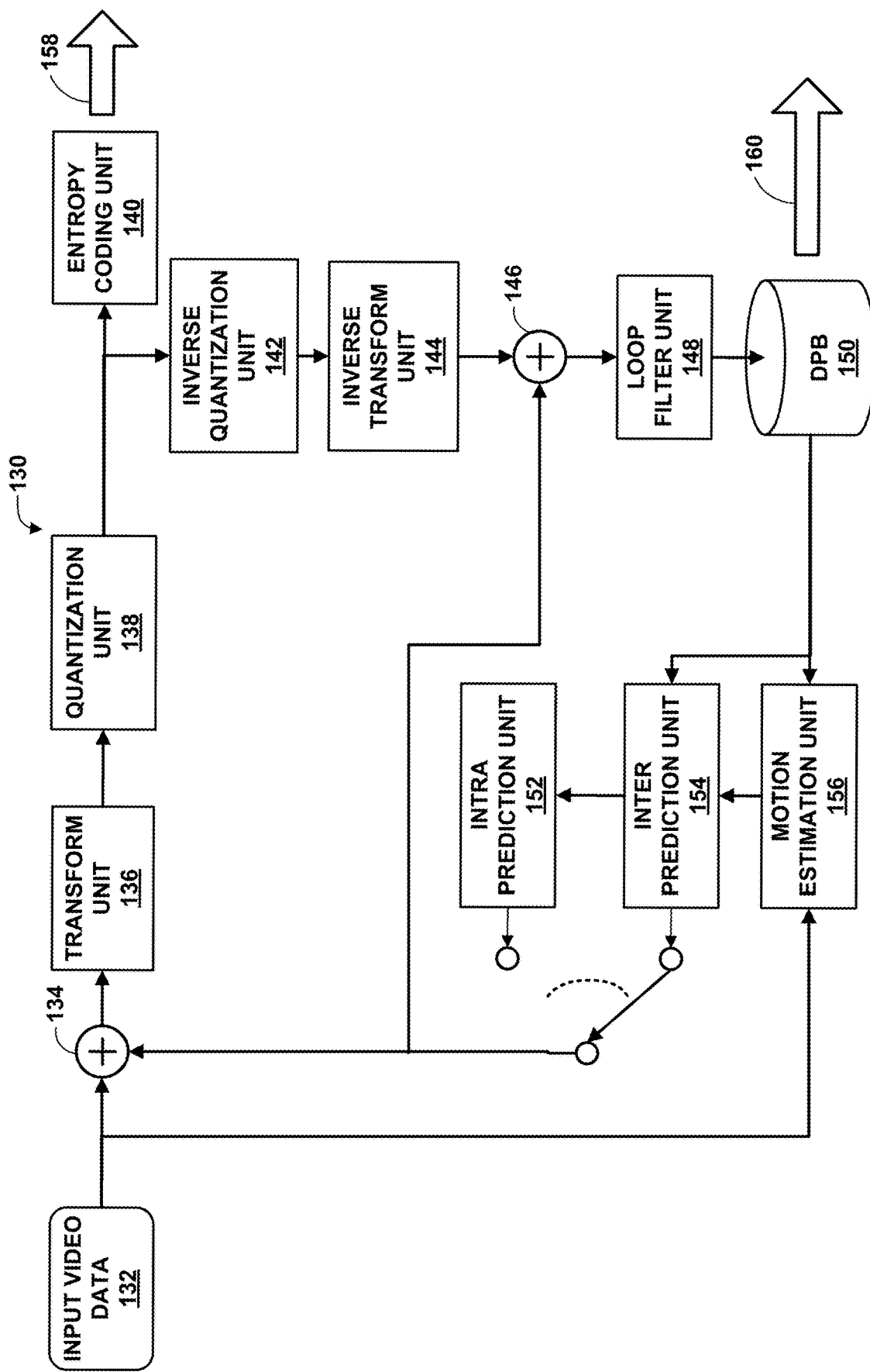
FIG. 2 is a conceptual diagram illustrating a hybrid video coding framework.

FIG. 2 is a conceptual diagram illustrating a hybrid video coding framework. Video coding standards since H.261 have been based on the so-called hybrid video coding principle, which is illustrated in FIG. 2. The term hybrid refers to the combination of two means to reduce redundancy in the video signal, i.e., prediction and transform coding with quantization of the prediction residual. Whereas prediction and transforms reduce redundancy in the video signal by decorrelation, quantization decreases the data of the transform coefficient representation by reducing their precision, ideally by removing only irrelevant details. This hybrid video coding design principle is also used in the two recent standards, ITU-T H.265/HEVC and ITU-T H.266/VVC.

As shown in FIG. 2, a modern hybrid video coder 130 generally includes block partitioning, motion-compensated or inter-picture prediction, intra-picture prediction, transformation, quantization, entropy coding, and post/in-loop filtering. In the example of FIG. 2, video coder 130 includes summation unit 134, transform unit 136, quantization unit 138, entropy coding unit 140, inverse quantization unit 142, inverse transform unit 144, summation unit 146, loop filter unit 148, decoded picture buffer (DPB) 150, intra prediction unit 152, inter-prediction unit 154, and motion estimation unit 156.

In general, video coder 130 may, when encoding video data, receive input video data 132. Block partitioning is used to divide a received picture (image) of the video data into smaller blocks for operation of the prediction and transform processes. Early video coding standards used a fixed block size, typically 16×16 samples. Recent standards, such as HEVC and VVC, employ tree-based partitioning structures to provide flexible partitioning.

Motion estimation unit 156 and inter-prediction unit 154 may predict input video data 132, e.g., from previously decoded data of DPB 150. Motion-compensated or inter-picture prediction takes advantage of the redundancy that exists between (hence "inter") pictures of a video sequence. According to block-based motion compensation, which is used in all the modern video codecs, the prediction is obtained from one or more previously decoded pictures, i.e., the reference picture(s). The corresponding areas to generate the inter prediction are indicated by motion information, including motion vectors and reference picture indices.

Summation unit 134 may calculate residual data as differences between input video data 132 and predicted data from intra prediction unit 152 or inter prediction unit 154. Summation unit 134 provides residual blocks to transform unit 136, which applies one or more transforms to the residual block to generate transform blocks. Quantization unit 138 quantizes the transform blocks to form quantized transform coefficients. Entropy coding unit 140 entropy encodes the quantized transform coefficients, as well as other syntax elements, such as motion information or intra-prediction information, to generate output bitstream 158.

Meanwhile, inverse quantization unit 142 inverse quantizes the quantized transform coefficients, and inverse transform unit 144 inverse transforms the transform coefficients, to reproduce residual blocks. Summation unit 146 combines the residual blocks with prediction blocks (on a sample-by-sample basis) to produce decoded blocks of video data. Loop filter unit 148 applies one or more filters (e.g., at least one of a neural network-based filter, a neural network-based loop filter, a neural network-based post loop filter, an adaptive in-loop filter, or a pre-defined adaptive in-loop filter) to the decoded block to produce filtered decoded blocks.

A block of video data, such as a CTU or CU, may in fact include multiple color components, e.g., a luminance or "luma" component, a blue hue chrominance or "chroma" component, and a red hue chrominance (chroma) component. The luma component may have a larger spatial resolution than the chroma components, and one of the chroma components may have a larger spatial resolution than the other chroma component. Alternatively, the luma component may have a larger spatial resolution than the chroma components, and the two chroma components may have equal spatial resolutions with each other For example, in 4:2:2 format, the luma component may be twice as large as the chroma components horizontally and equal to the chroma components vertically. As another example, in 4:2:0 format, the luma component may be twice as large as the chroma components horizontally and vertically. The various operations discussed above may generally be applied to each of the luma and chroma components individually (although certain coding information, such as motion information or intra-prediction direction, may be determined for the luma component and inherited by the corresponding chroma components).

In accordance with the techniques of this disclosure, loop filter unit 148 may receive a first color component (e.g., a luminance or "luma" component) having a first size and a second color component (e.g., a blue hue or red hue chrominance or "chroma" component) having a second size smaller than the first size from summation unit 146. A common block of video data may include both the first and second color components. Loop filter unit 148 may be configured to apply a downsampling convolutional neural network layer to the first color component of the block of video data to generate a downsampled first color component having the second size, i.e., to downsample the first color component to the size of the second color component. In one example, the first color component may be the luma component and the second component may be one of the two chroma components. In another example, the first color component may be a first chroma component and the second color component may be a second chroma component.

In yet another example, loop filter unit 148 may receive each of the luma and both chroma components, where the luma component has a first size, a first chroma component has a second size smaller than the first size, and a second chroma component has a third size smaller than the second size. In this example, loop filter unit may apply a downsampling convolutional neural network filter to both the luma component and the first chroma component to generate a downsampled luma component having the third size and a downsampled first chroma component having the third size.

Loop filter unit 148 may also filter the second color component to form a filtered second color component, e.g., using a convolutional neural network filter. Loop filter unit 148 may then concatenate the downsampled first color component with the filtered second color component to form concatenated color components. Then, loop filter unit 148 may filter the concatenated color components, e.g., using a convolutional neural network filter, to form a filtered concatenated component including a filtered downsampled first color component.

In particular, the first and second color components may originally be stored in separate arrays or matrices. To concatenate the color components, loop filter unit 148 may form a single array or matrix that is twice the width or twice the height of the individual color components. Loop filter unit 148 may then store samples of the first color component in a first region of the newly formed array or matrix and samples of the second color component in a second, neighboring region of the newly formed array or matrix. When three color components are used (e.g., luma, blue hue chroma, and red hue chroma), loop filter unit 148 may form a single array or matrix that is three times the width or height of the individual color components and store samples of each of the three color components in respective regions of the newly formed array or matrix.

As noted above, loop filter unit 148 may receive each of the luma and chroma components. Loop filter unit 148 may filter both of the downsampled first chroma component and the second chroma components, e.g., using a convolutional neural network filter, to generate a filtered downsampled first chroma component and filtered second chroma component. Loop filter unit 148 may then concatenate the downsampled luma component with the filtered downsampled first chroma component and the filtered second chroma component to form concatenated color components. Loop filter unit 148 may then filter the concatenated color components (including the downsampled luma component, the filtered downsampled first chroma component, and the filtered second chroma component), e.g., using a convolutional neural network filter.

After having filtered the concatenated color components, loop filter unit 148 may further upsample the filtered downsampled first color component back to the first size (i.e., the original size of the first color component). In cases where loop filter unit 148 also downsamples the second color component (e.g., from the second size to the third size), loop filter unit 148 may also upsample the filtered second color component to the second size (i.e., the original size of the second color component).

Figure 3:
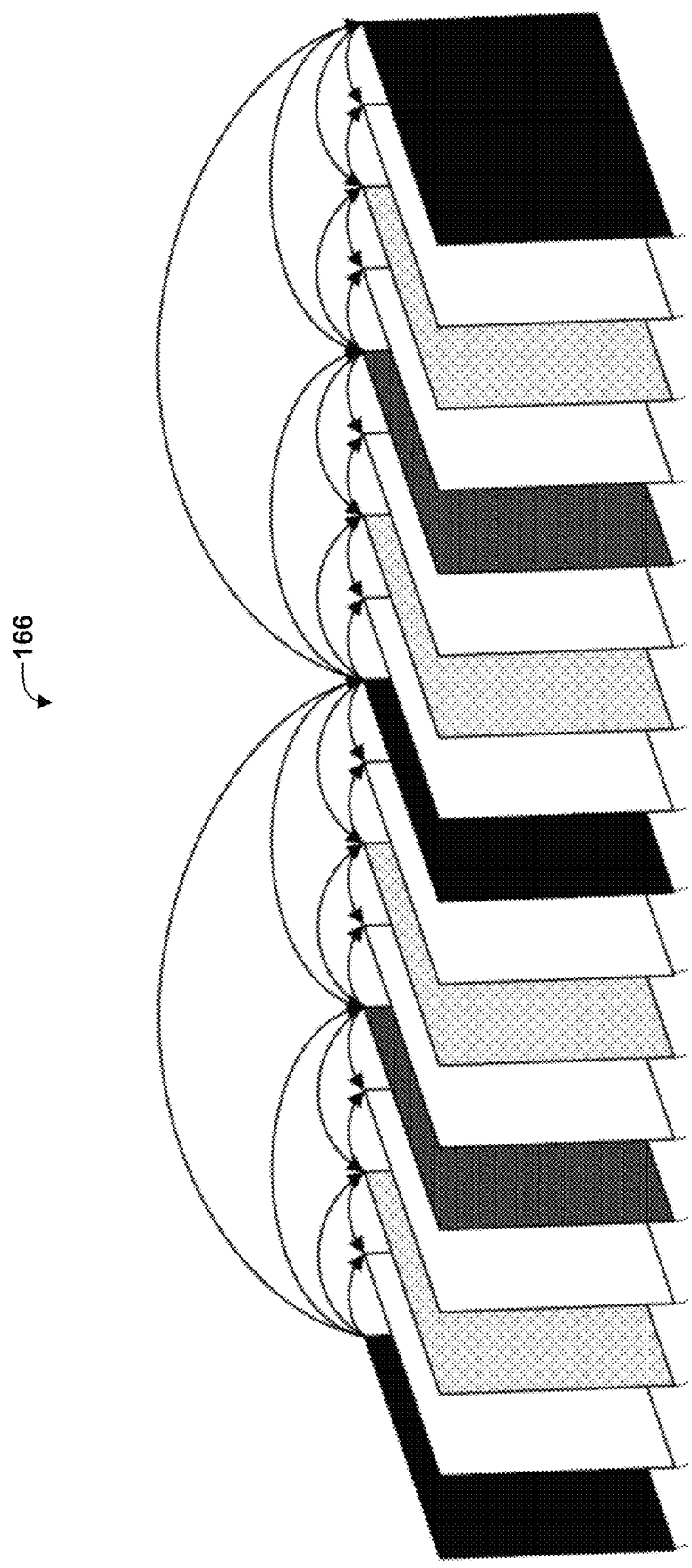
FIG. 3 is a conceptual diagram illustrating a hierarchical prediction structure using a group of pictures (GOP) size of 16.

FIG. 3 is a conceptual diagram illustrating a hierarchical prediction structure 166 using a group of pictures (GOP) size of 16. In recent video codecs, hierarchical prediction structures inside a group of pictures (GOP) is applied to improve coding efficiency.

Referring again to FIG. 2, intra-picture prediction exploits spatial redundancy that exists within a picture (hence "intra") by deriving the prediction for a block from already coded/decoded, spatially neighboring (reference) samples. The directional angular prediction, DC prediction and plane or planar prediction are used in the most recent video codec, including AVC, HEVC, and VVC.

Hybrid video coding standards apply a block transform to the prediction residual (regardless of whether it comes from inter- or intra-picture prediction). In early standards, including H.261, H.262, and H.263, a discrete cosine transform (DCT) is employed. In HEVC and VVC, more transform kernel besides DCT are applied, in order to account for different statistics in the specific video signal.

Quantization aims to reduce the precision of an input value or a set of input values in order to decrease the amount of data needed to represent the values. In hybrid video coding, quantization is typically applied to individual transformed residual samples, i.e., to transform coefficients, resulting in integer coefficient levels. In recent video coding standards, the step size is derived from a so-called quantization parameter (QP) that controls the fidelity and bit rate. A larger step size lowers the bit rate but also deteriorates the quality, which e.g., results in video pictures exhibiting blocking artifacts and blurred details.

Context-adaptive binary arithmetic coding (CABAC) is a form of entropy coding used in recent video codecs, e.g., AVC, HEVC, and VVC, due to its high efficiency.

Post/In-Loop Filtering is a filtering process (or combination of such processes) that is applied to the reconstructed picture to reduce the coding artifacts. The input of the filtering process is generally the reconstructed picture, which is the combination of the reconstructed residual signal (which includes quantization error) and the prediction. As shown in FIG. 2, the reconstructed pictures after in-loop filtering are stored and used as a reference for inter-picture prediction of subsequent pictures. The coding artifacts are mostly determined by the QP, therefore QP information is generally used in design of the filtering process. In HEVC, the in-loop filters include deblocking filtering and sample adaptive offset (SAO) filtering. In the VVC standard, an adaptive loop filter (ALF) was introduced as a third filter. The filtering process of ALF is as shown below:

$$R'(i, j)=R(i, j)+((\Sigma_{k=0} \Sigma_{l=0} f(k, l) \times K(R(i+k, j+l)-R(i, j), c(k, l))+64)>>7) \quad (1)$$

where R(i, j) is the set of samples before the filtering process, R'(i,j) is a sample value after the filtering process. f(k, l) denotes filter coefficients, K(x, y) is a clipping function and c(k, l) denotes the clipping parameters. The variables k and l vary between $$-\frac{L}{2} \text{ and } \frac{L}{2}$$

where L denotes me niter length. The clipping function K(x, y)=min (y, max(-y, x)), which corresponds to the function Clip3 (-y, y, x). The clipping operation introduces non-linearity to make ALF more efficient by reducing the impact of neighbor sample values that are too different with the current sample value. In VVC, the filtering parameters can be signalled in the bit stream, it can be selected from the pre-defined filter sets. The ALF filtering process can also summarized using the following equation:

$$R'(i, j)=R(i, j)+\text{ALF\_residual\_ouput}(R) \quad (2)$$

Figure 4A:
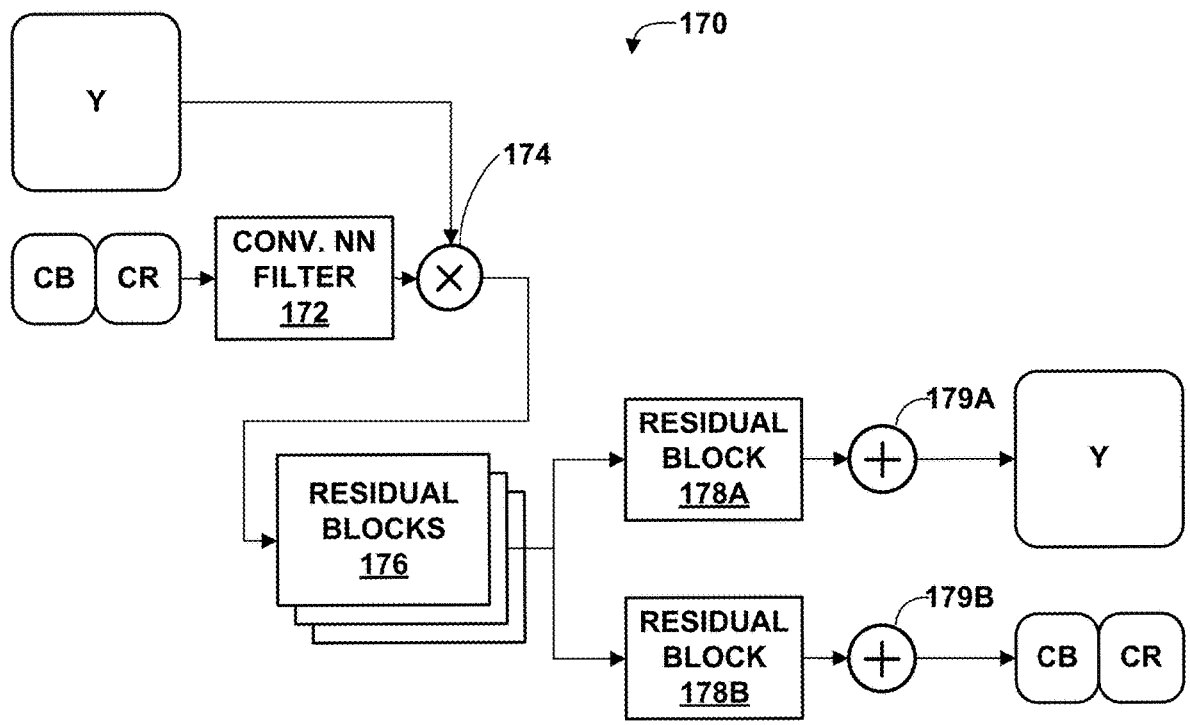
FIGS. 4A and 4B are conceptual diagrams illustrating an example joint component convolutional neural network (CNN)-based filter with a residual network (Resnet) including residual blocks.
Figure 4B:
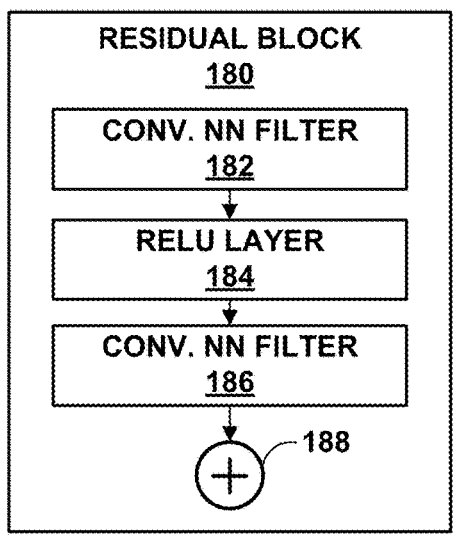

FIGS. 4A and 4B are conceptual diagrams illustrating an example joint component convolutional neural network (CNN)-based filter with a residual network (Resnet) including residual blocks. In particular, FIG. 4A depicts a system 170 including a convolutional neural network (conv. NN) filter 172, a concatenation unit 174, a series of residual blocks 176, residual blocks 178A, 178B (residual blocks 178), and channel-wise addition units 179A, 179B (channel-wise addition units 179). FIG. 4B depicts an example residual block 180. Any of residual blocks 176, 178 may include components similar to those of residual block 180. In the example of FIG. 4B, residual block 180 includes convolutional NN filters 182 and 186, rectified linear unit (ReLU) layer 184, and summation unit 188.

In the example of FIG. 4A, convolutional NN filter 172 upsamples chroma components (that is, blue hue (Cb) and red hue (Cr) components) to the size of a corresponding luminance (luma (Y) component. Concatenation unit 174 concatenates the upsampled chrominance samples with luma samples to be used as inputs to the NN-based filter formed by residual blocks 176. The filtering process performed by residual blocks 176 can also be generalized as follows:

$$R'(i, j)=R(i, j)+\text{NN\_filter\_residual\_ouput}(R) \quad (3)$$

Loop filters of video encoder 200 and video decoder 300 may include components similar to those of system 170 of FIG. 4A. The model structure and model parameters of the NN-based filter(s) can be pre-defined and stored at video encoder 200 and video decoder 300. Additionally or alternatively, video encoder 200 may signal data representing the NN-based filters in the bitstream.

After residual blocks 176 apply NN-based filters to the concatenated components, residual blocks 178A and 178B may apply channel-specific filtering to individual color components, then channel-wise addition units 179A, 179B may separate the components into the respective color channels Y, Cb, and Cr.

In the example of FIG. 4B, convolutional NN filter 182 may first filter received samples of video data. Convolutional NN filter 182 and convolutional NN filter 186 may be 3×3×K×K convolutional NN filters. Residual block 180 may also be referred to as a "residual processing unit." ReLU layer 184 may provide an activation function that outputs, for each sample, the sample value itself when the sample value is greater than zero, otherwise zero for the sample value if the input sample value is less than zero. That is, the ReLU activation function may be summarized as follows:

$$f(s) = \begin{cases} s, s > 0 \\ 0, s \leq 0 \end{cases}$$

Convolutional NN filter 186 may then filter the resulting sample values from ReLU layer 184 and provide the filtered sample values to summation unit 188. Summation unit 188 may add the filtered sample values to corresponding input sample values.

This disclosure recognizes that in some cases, neural network size may be increased and computational complexity may increase as a result of upsampling chroma blocks to the size of corresponding luma blocks.

Video encoder 200 and video decoder 300 of FIG. 1, or video coder 130 of FIG. 2, may be configured, according to the techniques of this disclosure, to perform any or all of the following techniques, alone or in any combination. In general, video encoder 200, video decoder 300, and video coder 130 may separately apply a convolutional neural network (CNN) layer to some or all color components first, to align sizes among the color components. Video encoder 200 and video decoder 300 may set the size of the output neural (or tensor) blocks to be equal to the size of the color component block with the smallest size among all of the color components. Then, video encoder 200 and video decoder 300 may apply joint convolutional NN layer(s) to all components with the same size. As a specific and general useful application, for the video sequence of 4:2:0 color format, the luma component blocks are downsampled using a convolutional NN layer with a stride of 2 in both the horizontal and the vertical directions. The output of the convolutional NN layer may have the same block size to that of the chroma component. Then, video encoder 200 and video decoder 300 may apply joint convolutional NN layers to the data of all color components as inputs.

Figure 5A:
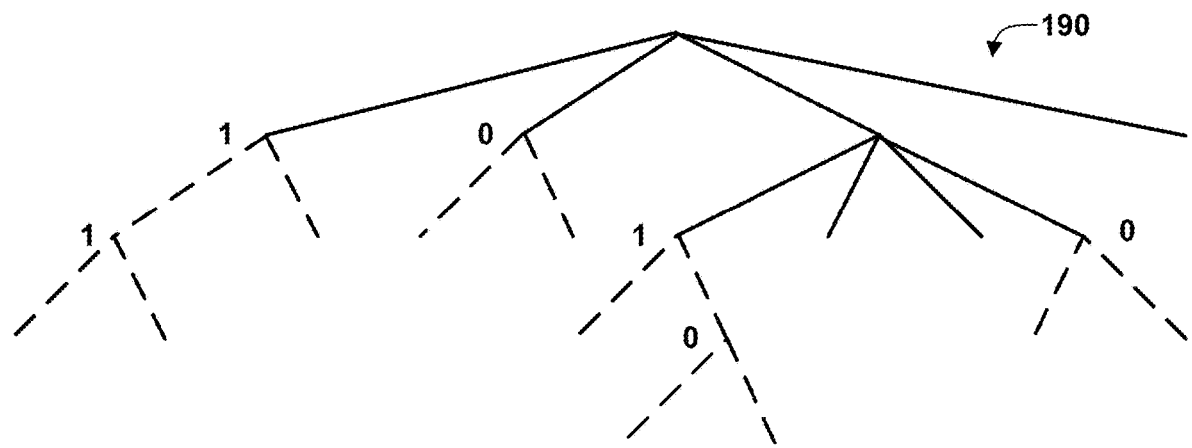
FIGS. 5A and 5B are conceptual diagrams illustrating an example quadtree binary tree (QTBT) structure, and a corresponding coding tree unit (CTU).
Figure 5B:
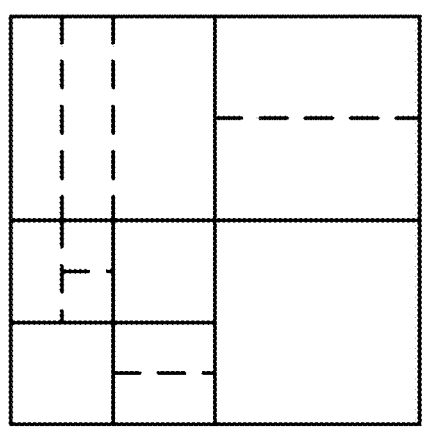

FIGS. 5A and 5B are conceptual diagrams illustrating an example quadtree binary tree (QTBT) structure 190, and a corresponding coding tree unit (CTU) 192. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 190 (i.e., the solid lines) and syntax elements (such as splitting information) for a prediction tree level of QTBT structure 190 (i.e., the dashed lines). Video encoder 200 may encode, and video decoder 300 may decode, video data, such as prediction and transform data, for CUs represented by terminal leaf nodes of QTBT structure 190.

In general, CTU 192 of FIG. 5B may be associated with parameters defining sizes of blocks corresponding to nodes of QTBT structure 190 at the first and second levels. These parameters may include a CTU size (representing a size of CTU 192 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 190 represents such nodes as including the parent node and child nodes having solid lines for branches. If nodes of the first level are not larger than the maximum allowed binary tree root node size (MaxBTSize), the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 190 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the quadtree leaf node will not be further split by the binary tree, since the size exceeds the MaxBTSize (i.e., 64×64, in this example). Otherwise, the quadtree leaf node may be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) it implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 6:
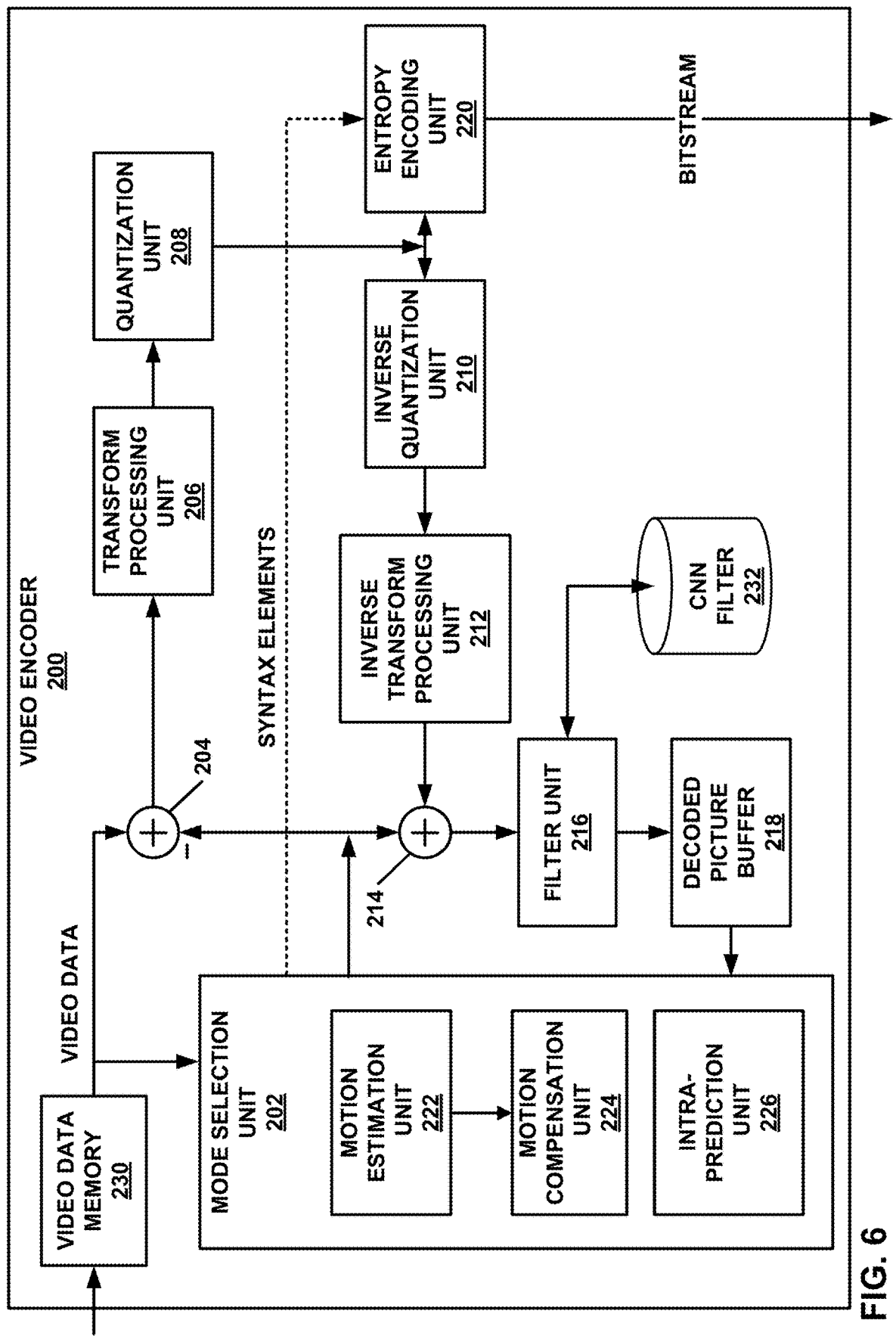
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the ITU-T H.265/HEVC video coding standard and the VVC video coding standard in development. However, the techniques of this disclosure are not limited to these video coding standards and are applicable generally to other video encoding and decoding standards.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes motion estimation unit 222, motion compensation unit 224, and intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead may generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. Filter unit 216 may be configured to perform the various techniques of this disclosure, e.g., to resize color components to a smallest color component size and then apply convolutional neural network (CNN) filter 232 to the resized color components.

In particular, rather than upsampling chroma components to the size of a corresponding luma component, filter unit 216 may apply one or more of CNN filters 232 to reduce the size of the luma component to the size of a smaller one of the chroma components. That is, filter unit 216 may receive a luma component having a first size and a chroma component having a second size smaller than the first size. Filter unit 216 may apply a convolutional NN filter of CNN filters 232 to the luma component to downsample the luma component to the second size. Filter unit 216 may filter the chroma component to form a filtered chroma component. Filter unit 216 may then concatenate the downsampled luma component with the filtered chroma component to form concatenated color components, then filter the concatenated color components to form a filtered concatenated component including a filtered downsampled first color component. Furthermore, filter unit 216 may upsample the filtered luma component of the second size back to the first size prior to storing the luma component in DPB 218.

In particular, the first and second color components may originally be stored in separate arrays or matrices. To concatenate the color components, filter unit 216 may form a single array or matrix that is twice the width or twice the height of the individual color components. Filter unit 216 may then store samples of the first color component in a first region of the newly formed array or matrix and samples of the second color component in a second, neighboring region of the newly formed array or matrix. When three color components are used (e.g., luma, blue hue chroma, and red hue chroma), filter unit 216 may form a single array or matrix that is three times the width or height of the individual color components and store samples of each of the three color components in respective regions of the newly formed array or matrix.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 7:
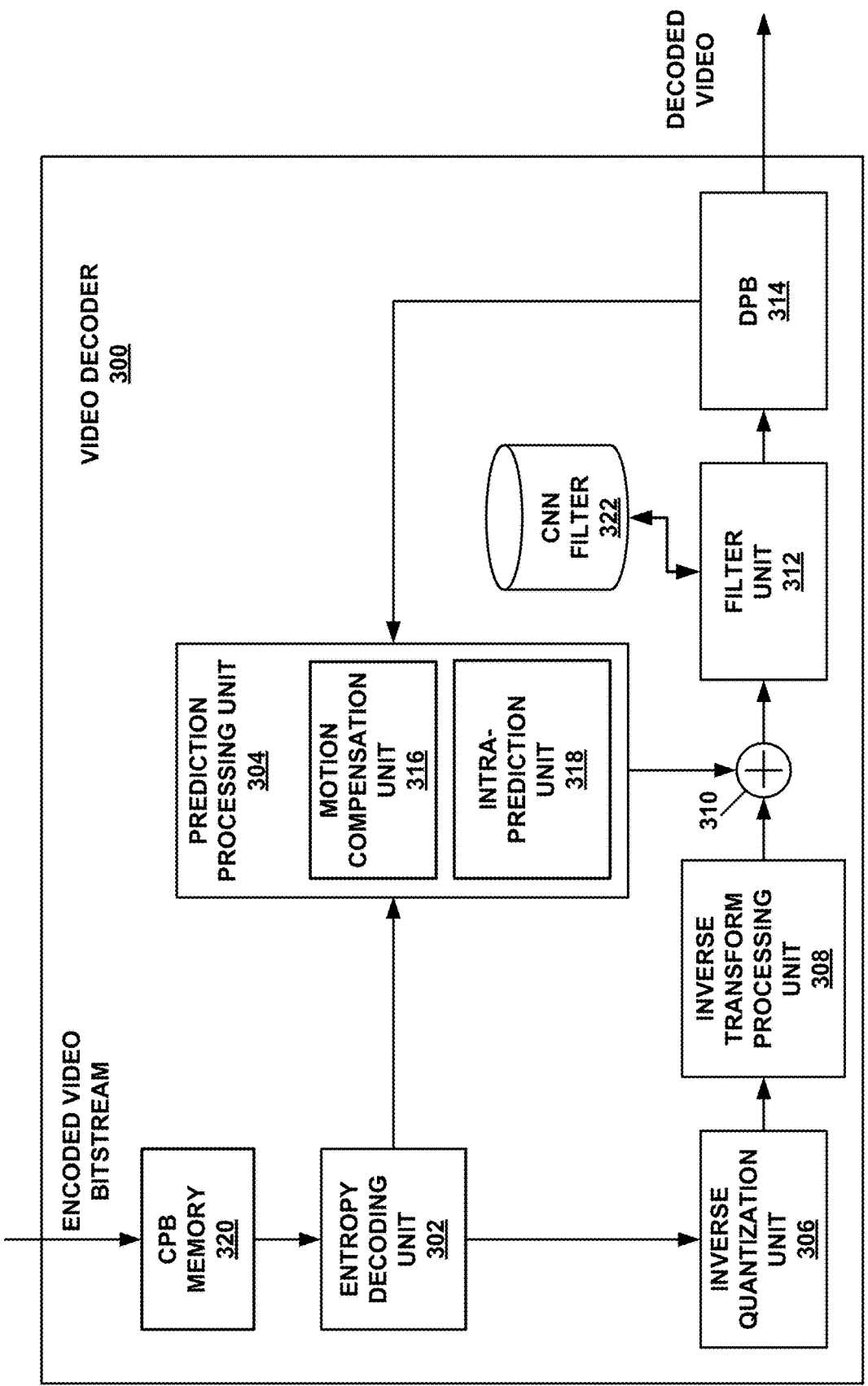
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC and HEVC (ITU-T H.265). However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. Filter unit 312 may be configured to apply techniques of this disclosure, e.g., to resize color components to a smallest color component size and then apply convolutional neural network (CNN) filter 322 to the resized color components.

In particular, rather than upsampling chroma components to the size of a corresponding luma component, filter unit 312 may apply one or more of CNN filters 322 to reduce the size of the luma component to the size of a smaller one of the chroma components. That is, filter unit 312 may receive a luma component having a first size and a chroma component having a second size smaller than the first size. Filter unit 312 may apply a convolutional NN filter of CNN filters 322 to the luma component to downsample the luma component to the second size. Filter unit 312 may filter the chroma component to form a filtered chroma component. Filter unit 312 may then concatenate the downsampled luma component with the filtered chroma component to form concatenated color components, then filter the concatenated color components to form a filtered concatenated component including a filtered downsampled first color component. Furthermore, filter unit 312 may upsample the filtered luma component of the second size back to the first size prior to storing the luma component in DPB 218.

In particular, the first and second color components may originally be stored in separate arrays or matrices. To concatenate the color components, filter unit 312 may form a single array or matrix that is twice the width or twice the height of the individual color components. Filter unit 312 may then store samples of the first color component in a first region of the newly formed array or matrix and samples of the second color component in a second, neighboring region of the newly formed array or matrix. When three color components are used (e.g., luma, blue hue chroma, and red hue chroma), filter unit 312 may form a single array or matrix that is three times the width or height of the individual color components and store samples of each of the three color components in respective regions of the newly formed array or matrix.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Figure 8:
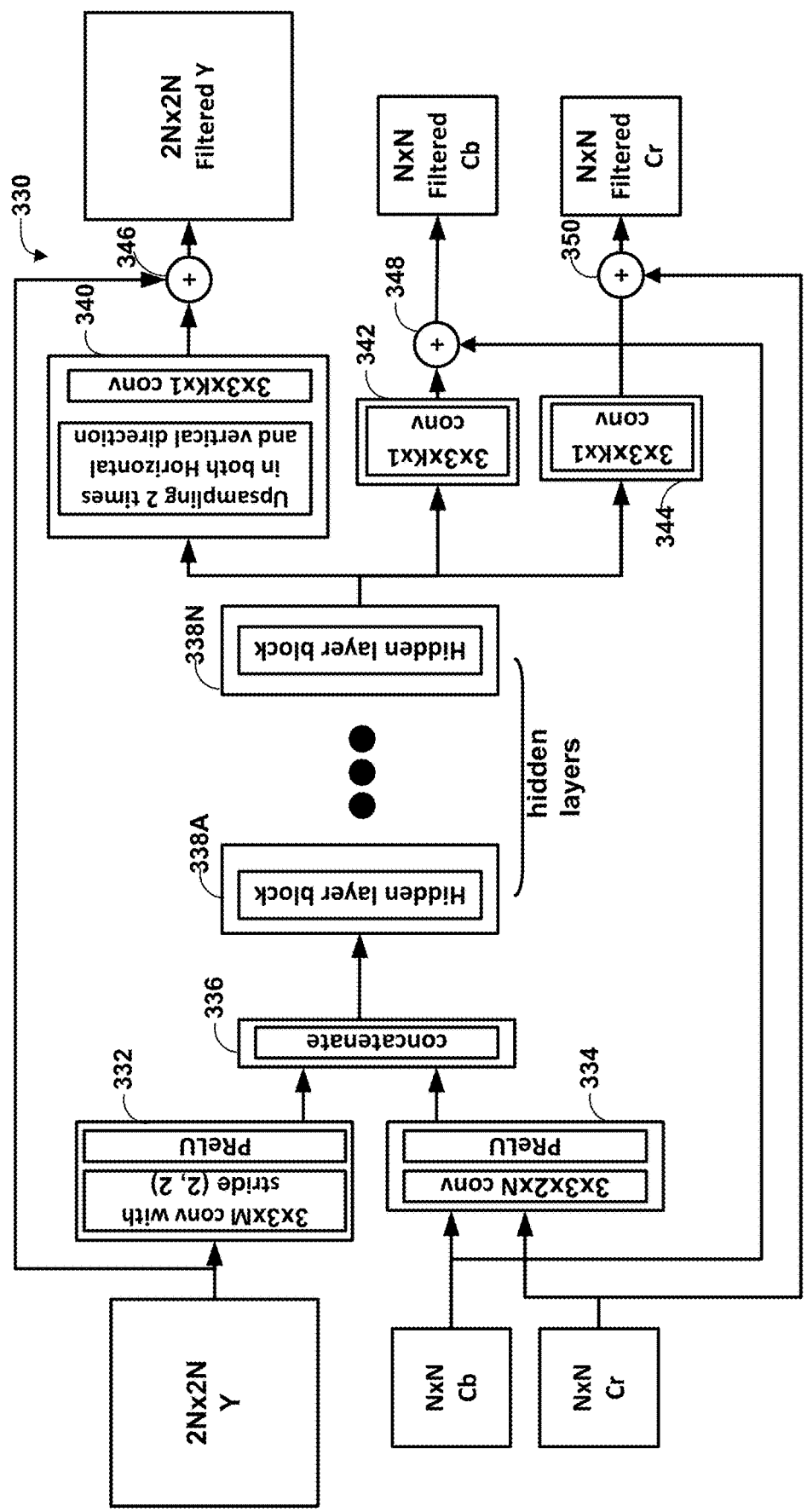
FIG. 8 is a block diagram illustrating an example of a joint component CNN filter according to the techniques of this disclosure.

FIG. 8 is a block diagram illustrating an example of a joint component convolutional neural network (CNN) filter unit 330 according to the techniques of this disclosure. The CNN filter of FIG. 8 may correspond to CNN filter 232 of FIG. 6 executed by filter unit 216 or CNN filter 322 executed by filter unit 312 of FIG. 7.

In this example, a filter unit 330 (e.g., filter unit 216 or 312) includes CNN filters 332, 334, 340, 342, and 344, concatenation unit 336, hidden layers 338A-338N (hidden layers 338), and channel adders 346, 348, 350. CNN filter 332 may downsample the luminance (luma) component with a convolutional NN (CNN) layer with a stride of 2 in both the horizontal and vertical directions. That is, CNN filter 332 may apply a 3×3×M convolutional NN layer filter with a stride of (2, 2) to the luma component, and then apply a PReLU activation function to the filtered samples of the luma component.

CNN filter 334 may then filter the chrominance components (i.e., Cb and Cr) and also apply a PReLU activation function to the filtered samples of the chroma components. Concatenation unit 336 may then concatenate the resulting output of the downsampled luma component with the output of CNN filter 334, to form concatenated color components. Then, hidden layers 338 may use the concatenated color components as input. At the last layer, CNN filter 340 may upsample the output from hidden layers 338, and then feed the upsampled data to CNN filter 340 to generate luma component output. Similarly, CNN filters 342 and 344 may filter corresponding chroma components of the output of hidden layers 338. Respective channel adders 346, 348, 350 may separate the concatenated color components into respective luma and chroma components.

The blocks of hidden layers 338 of FIG. 8 may be a combination of filters or functions. For example, the blocks of each of hidden layers 338 may include a convolutional NN filter plus an activation function or be a residual processing unit as shown in FIG. 9.

Figure 9:
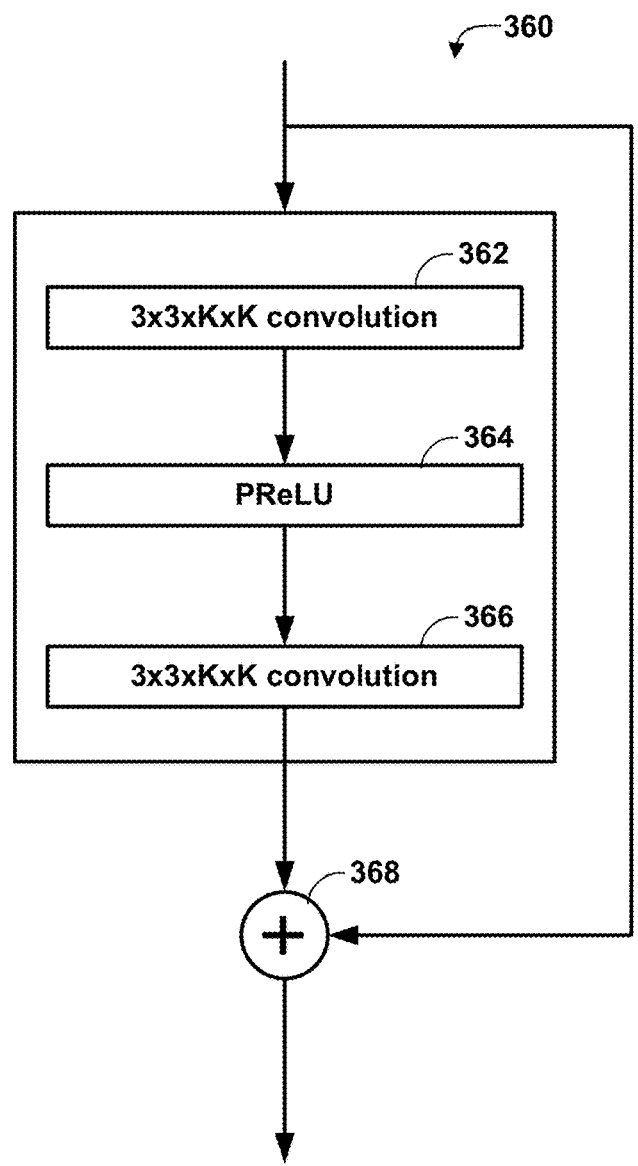
FIG. 9 is a conceptual diagram illustrating an example residual processing unit.

FIG. 9 is a conceptual diagram illustrating an example residual processing unit 360. Residual processing unit 360 may correspond to one or more of the blocks of hidden layers 338 of FIG. 8. In this example, residual processing unit 360 includes a first 3×3×K×K convolution layer 362, a parametric rectified linear unit (PReLU) layer 364, a second 3×3×K×K convolutional layer 366, and a summation unit 368. First 3×3×K×K convolution layer 362 may apply a first CNN filter to received samples, PReLU layer 364 may apply a PReLU activation function to the filtered samples, and second 3×3×K×K convolutional layer 366 may apply a second CNN filter to the filtered samples from PReLU layer 364. Ultimately, summation unit 368 may combine the filtered samples with received input samples.

Figure 10:
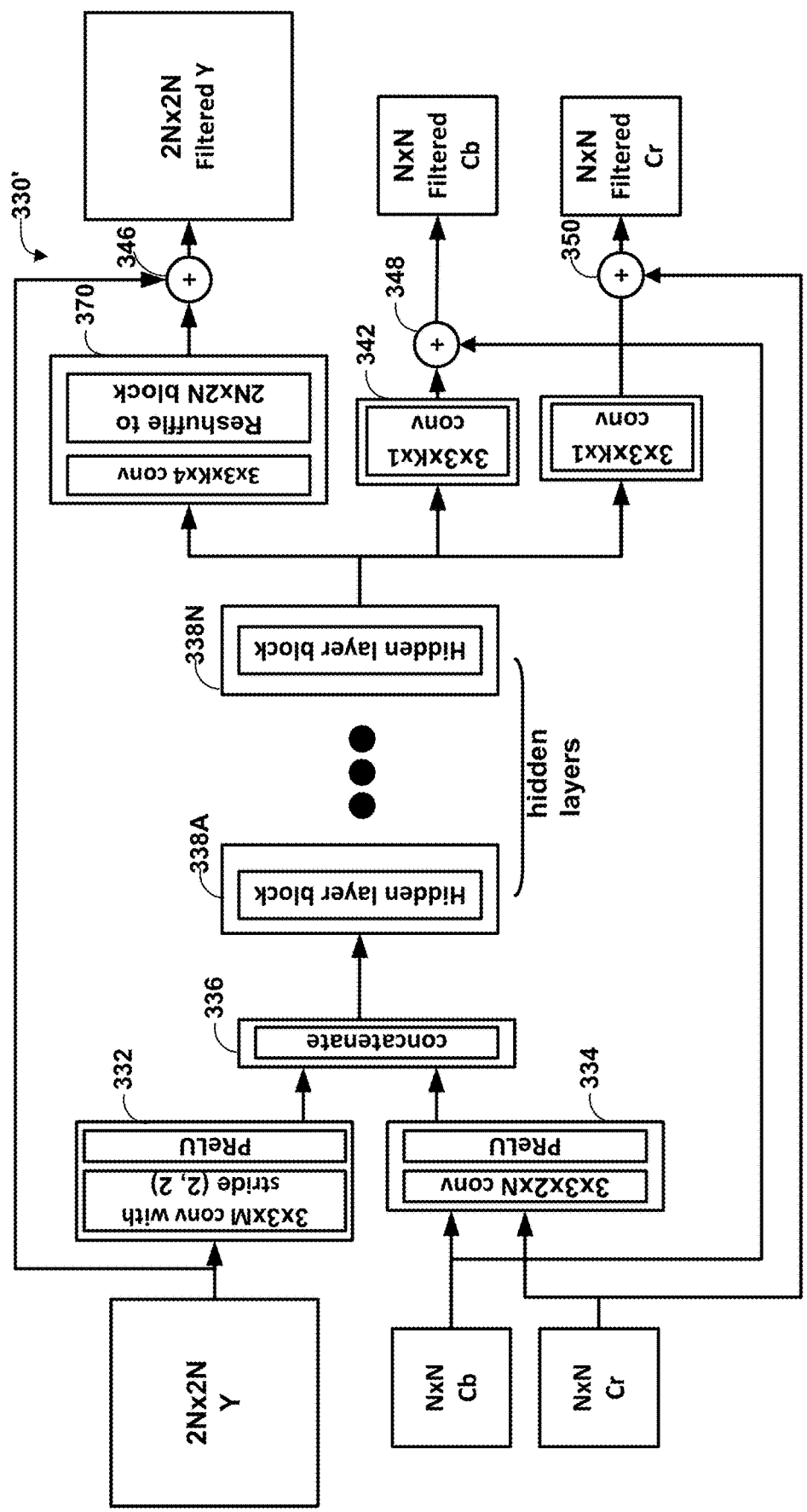
FIG. 10 is a block diagram illustrating another example of a joint component CNN filter design according to the techniques of this disclosure.

FIG. 10 is a block diagram illustrating another example of a joint component CNN filter unit 330' according to the techniques of this disclosure. CNN filter unit 330' of FIG. 10 may correspond to CNN filter 232 executed by filter unit 216 of FIG. 6 or CNN filter 322 executed by filter unit 312 of FIG. 7.

The example CNN filter unit 330' of FIG. 10 is substantially similar to CNN filter unit 330 of FIG. 8. However, in this example, CNN filter unit 330' includes block combination unit 370 instead of CNN filter 340 of CNN filter unit 330 of FIG. 8. Block combination unit 370 may form the 2N×2N luma block output by the set of hidden layers by combining four N×N blocks, which are the output of the last convolutional NN layer, wherein the last convolutional NN layer can also be a "ConvTranspose2d/De-convolution" operation with a stride of 2 in both the horizontal and vertical directions.

Figure 11:
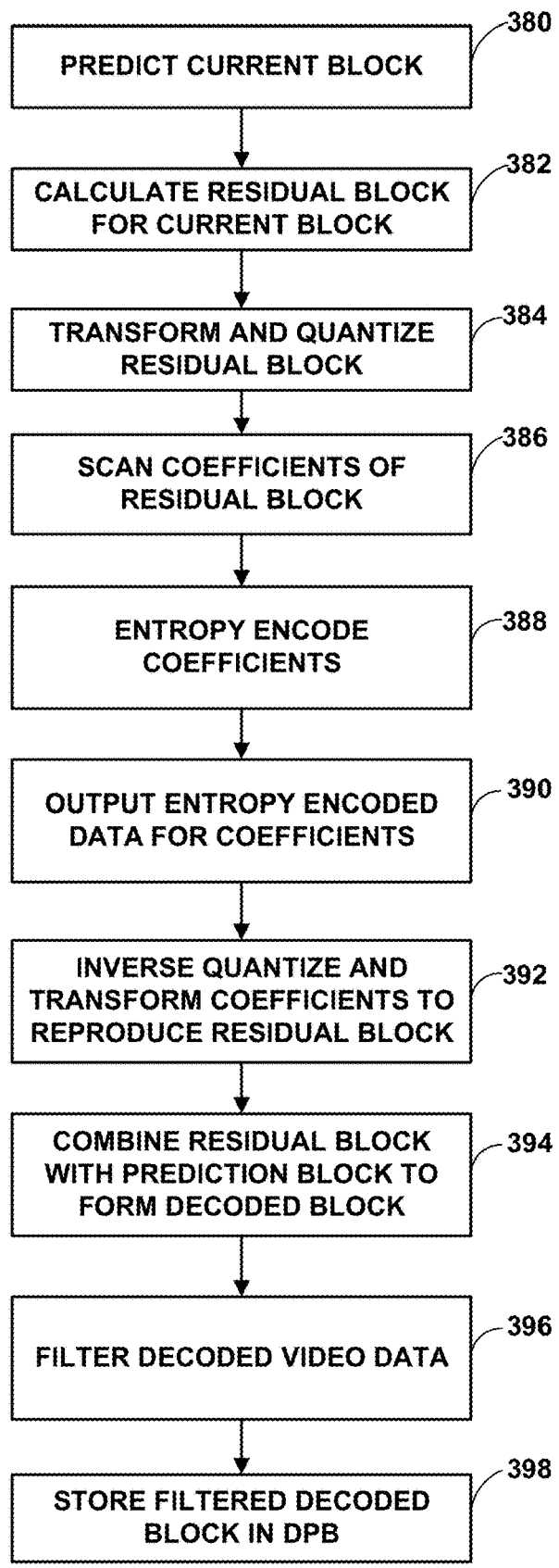
FIG. 11 is a flowchart illustrating an example method for filtering a decoded block in accordance with the techniques of this disclosure.

FIG. 11 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 11.

In this example, video encoder 200 initially predicts the current block (380). For example, video encoder 200 may form a prediction block for the current block. Video encoder 200 may then calculate a residual block for the current block (382). To calculate the residual block, video encoder 200 may calculate a difference between the original, uncoded block and the prediction block for the current block. Video encoder 200 may then transform and quantize coefficients of the residual block (384). Next, video encoder 200 may scan the quantized transform coefficients of the residual block (386). During the scan, or following the scan, video encoder 200 may entropy encode the coefficients (388). For example, video encoder 200 may encode the coefficients using CAVLC or CABAC. Video encoder 200 may then output the entropy encoded data of the block (390).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (392). Video encoder 200 may combine the residual block with the prediction block to form a decoded block (394).

According to the techniques of this disclosure, video encoder 200 may filter and refine the decoded block (396). For example, video encoder 200 may downsample a luminance component, e.g., using a convolutional neural network filter. Video encoder 200 may also filter a chrominance component, and then concatenate the downsampled luma component with the filtered chroma component. Video encoder 200 may further filter the concatenated color components to form a filtered concatenated component including a filtered downsampled first color component. Video encoder 200 may further filter the concatenated color components, and then upsample the filtered luma component to its original size. Video encoder 200 may then store the filtered, decoded blocks in DPB 218 (398).

In this manner, the method of FIG. 11 represents an example of a method of filtering decoded video data including applying a downsampling convolutional neural network layer to a first color component of a block of video data, the first color component of the block having a first size, wherein applying the downsampling convolutional neural network layer to the first color component generates a downsampled first color component having a second size smaller than the first size; filtering a second color component having the second size to form a filtered second color component; concatenating the downsampled first color component with the filtered second color component to form concatenated color components; and filtering the concatenated color components.

Figure 12:
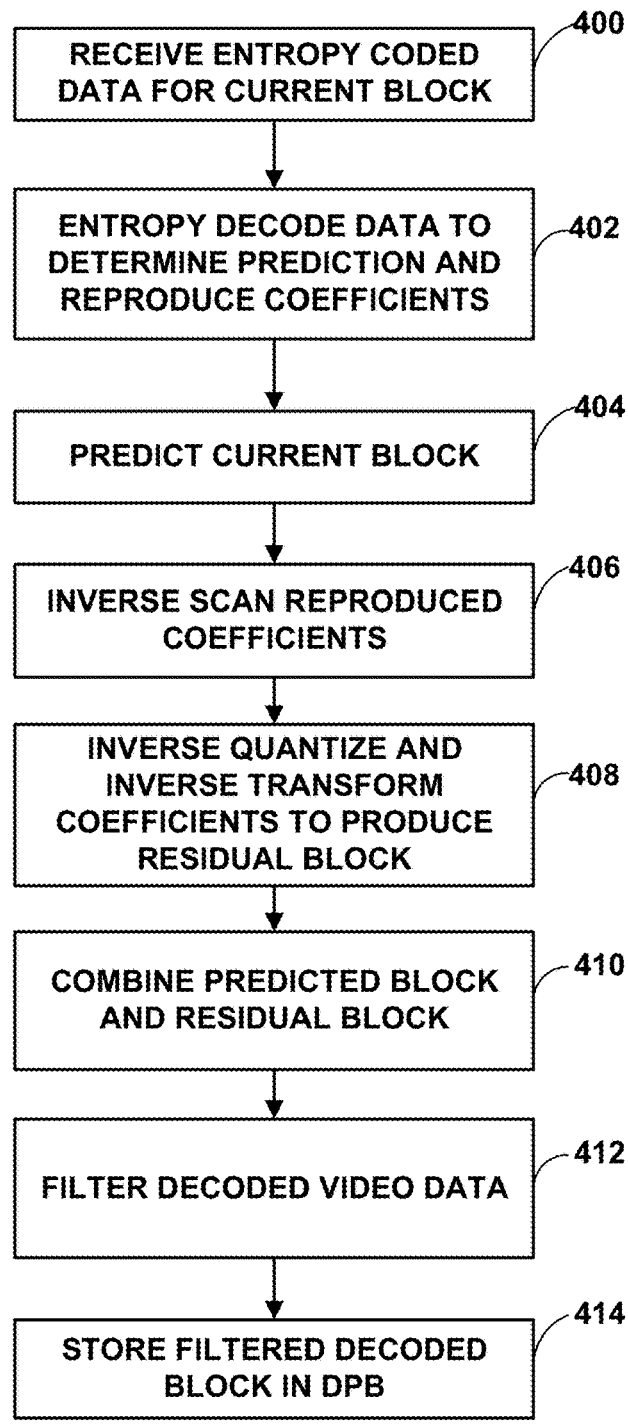
FIG. 12 is a flowchart illustrating an example method for filtering a decoded block in accordance with the techniques of this disclosure.

FIG. 12 is a flowchart illustrating an example method for decoding a current block in accordance with the techniques of this disclosure. The current block may comprise a current CU. Although described with respect to video decoder 300 (FIGS. 1 and 4), it should be understood that other devices may be configured to perform a method similar to that of FIG. 12.

Video decoder 300 may receive entropy encoded data for the current block, such as entropy encoded prediction information and entropy encoded data for coefficients of a residual block corresponding to the current block (400). Video decoder 300 may entropy decode the entropy encoded data to determine prediction information for the current block and to reproduce coefficients of the residual block (402). Video decoder 300 may predict the current block (404), e.g., using an intra- or inter-prediction mode as indicated by the prediction information for the current block, to calculate a prediction block for the current block. Video decoder 300 may then inverse scan the reproduced coefficients (406), to create a block of quantized transform coefficients. Video decoder 300 may then inverse quantize and inverse transform the quantized transform coefficients to produce a residual block (408). Video decoder 300 may ultimately decode the current block by combining the prediction block and the residual block (410).

Video decoder 300 may also filter the decoded video data (412), e.g., using a convolutional NN filter as discussed above according to the techniques of this disclosure. For example, video decoder 300 may downsample a luminance component, e.g., using a convolutional neural network filter. Video decoder 300 may also filter a chrominance component, and then concatenate the downsampled luma component with the filtered chroma component. Video decoder 300 may further filter the concatenated color components. Video decoder 300 may further filter the concatenated color components, and then upsample the filtered luma component to its original size. Video decoder 300 may then store the filtered, decoded blocks in DPB 218 (414).

In this manner, the method of FIG. 12 represents an example of a method of filtering decoded video data including applying a downsampling convolutional neural network layer to a first color component of a block of video data, the first color component of the block having a first size, wherein applying the downsampling convolutional neural network layer to the first color component generates a downsampled first color component having a second size smaller than the first size; filtering a second color component having the second size to form a filtered second color component; concatenating the downsampled first color component with the filtered second color component to form concatenated color components; and filtering the concatenated color components.

Figure 13:
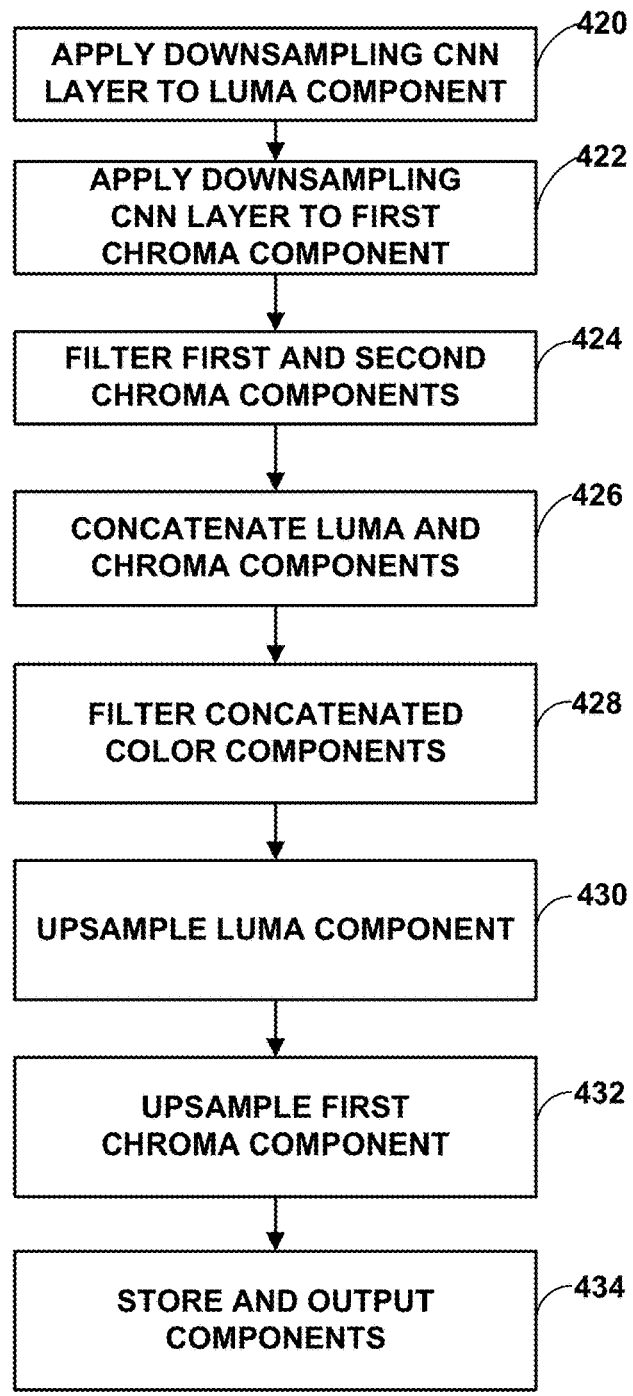
FIG. 13 is a flowchart illustrating an example method of filtering decoded video data according to the techniques of this disclosure.

FIG. 13 is a flowchart illustrating an example method of filtering decoded video data according to the techniques of this disclosure. Video encoder 200, video decoder 300, or video coder 130 may perform the method of FIG. 13. For purposes of example, the method of FIG. 13 is explained with respect to video decoder 300.

Initially, video decoder 300 may receive and decode video data. The decoded video data may include a luminance (luma) component and two chrominance (chroma) components (e.g., Cb and Cr data). It is assumed in this example that the luma component each of these components has a different size, i.e., that the luma component has a first size, the first chroma component has a second size, and the second chroma component has a third size, where the second size is smaller than the first size and the third size is smaller than the second size. For example, the video data may have a 4:2:0 format, in this example.

Video decoder 300 may apply a downsampling CNN layer to the luma component (420), producing a downsampled luma component having the third size. Video decoder 300 may also apply the downsampling CNN layer (or a different downsampling CNN layer) to the first chroma component (422), producing a first downsampled chroma component having the third size. Video decoder 300 may then filter the first downsampled chroma component and the second chroma component (424), e.g., using CNN filters.

Video decoder 300 may then concatenate the luma and chroma components (426), producing concatenated color components. Video decoder 300 may then filter the concatenated color components (428), e.g., using a CNN filter (such as hidden layers 338 of FIGS. 8 and 10).

Video decoder 300 may then upsample the luma component (430) of the filtered, concatenated color components to the first size, and upsample the first chroma component (432) of the filtered, concatenated color components to the second size. Video decoder 300 may then store the components to DPB 314 and output the components (434).

In this manner, the method of FIG. 13 represents an example of a method of filtering decoded video data including applying a downsampling convolutional neural network layer to a first color component of a block of video data, the first color component of the block having a first size, wherein applying the downsampling convolutional neural network layer to the first color component generates a downsampled first color component having a second size smaller than the first size; filtering a second color component having the second size to form a filtered second color component; concatenating the downsampled first color component with the filtered second color component to form concatenated color components; and filtering the concatenated color components.

Figure 14:
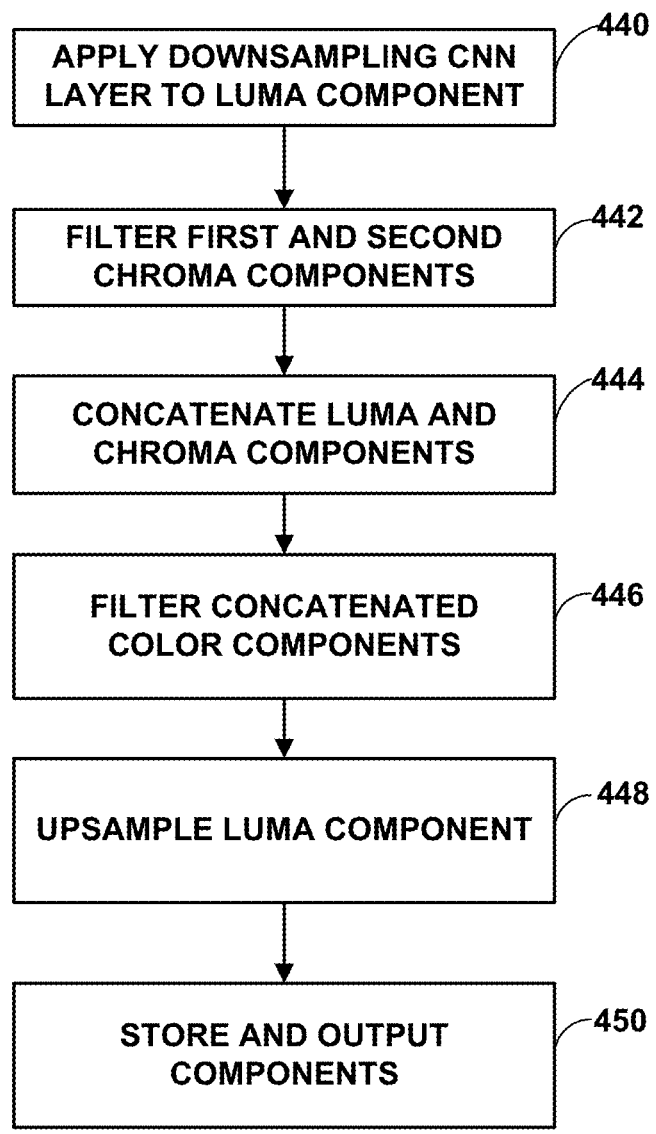
FIG. 14 is a flowchart illustrating an example method of filtering decoded video data according to the techniques of this disclosure.

FIG. 14 is a flowchart illustrating an example method of filtering decoded video data according to the techniques of this disclosure. Video encoder 200, video decoder 300, or video coder 130 may perform the method of FIG. 14. For purposes of example, the method of FIG. 14 is explained with respect to video decoder 300.

Initially, video decoder 300 may receive and decode video data. The decoded video data may include a luminance (luma) component and two chrominance (chroma) components (e.g., Cb and Cr data). It is assumed in this example that the luma component has a first size, and the first chroma component and the second chroma component have a second size, where the second size is smaller than the first size. For example, the video data may have a 4:2:0 format or a 4:2:2 format, in this example.

Video decoder 300 may apply a downsampling CNN layer to the luma component (440), producing a downsampled luma component having the second size. Video decoder 300 may then filter the first chroma component and the second chroma component (442), e.g., using CNN filters.

Video decoder 300 may then concatenate the luma and chroma components (444), producing concatenated color components. Video decoder 300 may then filter the concatenated color components (446), e.g., using a CNN filter (such as hidden layers 338 of FIGS. 8 and 10).

Video decoder 300 may then upsample the luma component (448) of the filtered, concatenated color components to the first size. Video decoder 300 may then store the components to DPB 314 and output the components (450).

In this manner, the method of FIG. 14 represents an example of a method of filtering decoded video data including applying a downsampling convolutional neural network layer to a first color component of a block of video data, the first color component of the block having a first size, wherein applying the downsampling convolutional neural network layer to the first color component generates a downsampled first color component having a second size smaller than the first size; filtering a second color component having the second size to form a filtered second color component; concatenating the downsampled first color component with the filtered second color component to form concatenated color components; and filtering the concatenated color components.

Certain examples of the techniques of this disclosure are summarized in the following clauses:

Clause 1: A method of filtering decoded video data, the method comprising: applying a downsampling convolutional neural network layer to a first color component of a block of video data, the first color component of the block having a first size, wherein applying the downsampling convolutional neural network layer to the first color component generates a downsampled first color component having a second size; filtering the downsampled first color component using one or more convolutional neural network layer filters; and filtering a second color component of the block of video data using the one or more convolutional neural network layer filters.

Clause 2: The method of clause 1, further comprising upsampling the filtered downsampled first color component to the first size.

Clause 3: The method of clause 1, further comprising combining two or more filtered downsampled blocks of the first color component, including the filtered downsampled block, to generate an upsampled first color component having the first size.

Clause 4: The method of clause 3, wherein the first size comprises 2N×2N, and wherein the two or more filtered downsampled blocks of the first color component comprise four N×N filtered downsampled blocks of the first color component.

Clause 5: The method of any of clauses 1-4, wherein the downsampling convolutional neural network layer comprises a 3×3×M convolutional neural network layer filter with a stride of 2.

Clause 6: The method of any of clauses 1-5, wherein the one or more convolutional neural network layer filters comprise a residual processing unit.

Clause 7: The method of clause 6, wherein the residual processing unit comprises a first 3×3×K×K convolution layer, a PReLU layer, and a second 3×3×K×K convolution layer.

Clause 8: The method of any of clauses 1-7, further comprising concatenating the downsampled first color component with the second color component.

Clause 9: The method of any of clauses 1-8, further comprising filtering a third color component of the block of video data using the one or more convolutional neural network layer filters.

Clause 10: The method of clause 9, wherein the second size comprises the smaller of a size of the second color component or a size of the third color component.

Clause 11: The method of any of clauses 1-10, wherein the first color component comprises a luminance component, and wherein the second color component comprises one of a blue hue chrominance component or a red hue chroma chrominance component.

Clause 12: A device for decoding video data, the device comprising one or more means for performing the method of any of clauses 1-11.

Clause 13: The device of clause 12, wherein the one or more means comprise one or more processors implemented in circuitry.

Clause 14: The device of clause 12, further comprising a display configured to display the decoded video data.

Clause 15: The device of clause 12, wherein the device comprises one or more of a camera, a computer, a mobile device, a broadcast receiver device, or a set-top box.

Clause 16: The device of clause 12, further comprising a memory configured to store the video data.

Clause 17: A computer-readable storage medium having stored thereon instructions that, when executed, cause a processor to perform the method of any of clauses 1-11.

Clause 18: A method of filtering decoded video data, the method comprising: applying a downsampling convolutional neural network layer to a first color component of a block of video data, the first color component of the block having a first size, wherein applying the downsampling convolutional neural network layer to the first color component generates a downsampled first color component having a second size smaller than the first size; filtering a second color component having the second size to form a filtered second color component; concatenating the downsampled first color component with the filtered second color component to form concatenated color components; and filtering the concatenated color components.

Clause 19: The method of clause 18 further comprising upsampling the filtered downsampled first color component to the first size.

Clause 20: The method of clause 18 further comprising combining two or more filtered downsampled blocks of the first color component, including the filtered downsampled block, to generate an upsampled first color component having the first size.

Clause 21: The method of clause 20, wherein the first size comprises 2N×2N, and wherein the two or more filtered downsampled blocks of the first color component comprise four N×N filtered downsampled blocks of the first color component.

Clause 22: The method of clause 18 wherein the downsampling convolutional neural network layer comprises a 3×3×M convolutional neural network layer filter with a stride of 2.

Clause 23: The method of clause 18 wherein the one or more convolutional neural network layer filters comprises a residual processing unit.

Clause 24: The method of clause 23, wherein the residual processing unit comprises a first 3×3×K×K convolution layer, a PReLU layer, and a second 3×3×K×K convolution layer.

Clause 25: The method of clause 18 further comprising filtering a third color component of the block of video data using the one or more convolutional neural network layer filters.

Clause 26: The method of clause 25, wherein the second size comprises the smaller of a size of the second color component or a size of the third color component.

Clause 27: The method of clause 18 wherein the first color component comprises a luminance component, and wherein the second color component comprises one of a blue hue chrominance component or a red hue chroma chrominance component.

Clause 28: The method of clause 18 wherein filtering the second color component comprises filtering the second color component using a convolutional neural network filter.

Clause 29: The method of clause 18 wherein filtering the concatenated color components comprises filtering the concatenated color components using a convolutional neural network filter.

Clause 30: A device for decoding video data, the device comprising: a memory configured to store video data; and one or more processors implemented in circuitry and configured to: apply a downsampling convolutional neural network layer to a first color component of a block of video data, the first color component of the block having a first size, wherein applying the downsampling convolutional neural network layer to the first color component generates a downsampled first color component having a second size smaller than the first size; filter a second color component having the second size to form a filtered second color component; concatenate the downsampled first color component with the filtered second color component to form concatenated color components; and filter the concatenated color components.

Clause 31: The device of clause 30, wherein the one or more processors are further configured to upsample the filtered downsampled first color component to the first size.

Clause 32: The device of clause 30, wherein the one or more processors are further configured to combine two or more filtered downsampled blocks of the first color component, including the filtered downsampled block, to generate an upsampled first color component having the first size.

Clause 33: The device of clause 32, wherein the first size comprises 2N×2N, and wherein the two or more filtered downsampled blocks of the first color component comprise four N×N filtered downsampled blocks of the first color component.

Clause 34: The device of clause 30, wherein the downsampling convolutional neural network layer comprises a 3×3×M convolutional neural network layer filter with a stride of 2.

Clause 35: The device of clause 30, wherein the one or more convolutional neural network layer filters comprise a residual processing unit.

Clause 36: The device of clause 35, wherein the residual processing unit comprises a first 3×3×K×K convolution layer, a PReLU layer, and a second 3×3×K×K convolution layer.

Clause 37: The device of clause 30, wherein the one or more processors are further configured to filter a third color component of the block of video data using the one or more convolutional neural network layer filters.

Clause 38: The device of clause 37, wherein the second size comprises the smaller of a size of the second color component or a size of the third color component.

Clause 39: The device of clause 30, wherein the first color component comprises a luminance component, and wherein the second color component comprises one of a blue hue chrominance component or a red hue chroma chrominance component.

Clause 40: The device of clause 30, wherein the one or more processors are configured to filter the second color component using a convolutional neural network filter.

Clause 41: The device of clause 30, wherein the one or more processors are configured to filter the concatenated color components using a convolutional neural network filter.

Clause 42: The device of clause 30, further comprising a display configured to display video data corresponding to the concatenated color components.

Clause 43: The device of clause 30, wherein the device comprises one or more of a camera, a computer, a mobile device, a broadcast receiver device, or a set-top box.

Clause 44: A computer-readable storage medium having stored thereon instructions that, when executed, cause a processor to: apply a downsampling convolutional neural network layer to a first color component of a block of video data, the first color component of the block having a first size, wherein applying the downsampling convolutional neural network layer to the first color component generates a downsampled first color component having a second size smaller than the first size; filter a second color component having the second size to form a filtered second color component; concatenate the downsampled first color component with the filtered second color component to form concatenated color components; and filter the concatenated color components.

Clause 45: The computer-readable storage medium of clause 44, further comprising instructions that cause the processor to upsample the filtered downsampled first color component to the first size.

Clause 46: The computer-readable storage medium of clause 44, further comprising instructions that cause the processor to combine two or more filtered downsampled blocks of the first color component, including the filtered downsampled block, to generate an upsampled first color component having the first size.

Clause 47: The computer-readable storage medium of clause 46, wherein the first size comprises 2N×2N, and wherein the two or more filtered downsampled blocks of the first color component comprise four N×N filtered downsampled blocks of the first color component.

Clause 48: The computer-readable storage medium of clause 44, wherein the downsampling convolutional neural network layer comprises a 3×3×M convolutional neural network layer filter with a stride of 2.

Clause 49: The computer-readable storage medium of clause 44, wherein the one or more convolutional neural network layer filters comprise a first 3×3×K×K convolution layer, a PReLU layer, and a second 3×3×K×K convolution layer.

Clause 50: The computer-readable storage medium of clause 44, wherein the one or more processors are further configured to filter a third color component of the block of video data using the one or more convolutional neural network layer filters.

Clause 51: The computer-readable storage medium of clause 50, wherein the second size comprises the smaller of a size of the second color component or a size of the third color component.

Clause 52: The computer-readable storage medium of clause 44, wherein the first color component comprises a luminance component, and wherein the second color component comprises one of a blue hue chrominance component or a red hue chroma chrominance component.

Clause 53: The computer-readable storage medium of clause 44, wherein the instructions that cause the processor to filter the second color component comprise instructions that cause the processor to filter the second color component using a convolutional neural network filter.

Clause 54: The computer-readable storage medium of clause 44, wherein the instructions that cause the processor to filter the second color component comprise instructions that cause the processor to filter the concatenated color components using a convolutional neural network filter.

Clause 55: A device for filtering decoded video data, the device comprising: means for applying a downsampling convolutional neural network layer to a first color component of a block of video data, the first color component of the block having a first size, wherein applying the downsampling convolutional neural network layer to the first color component generates a downsampled first color component having a second size smaller than the first size; means for filtering a second color component having the second size to form a filtered second color component; means for concatenating the downsampled first color component with the filtered second color component to form concatenated color components; and means for filtering the concatenated color components.

Clause 56: The device of clause 55, wherein the means for filtering the second color component comprises means for filtering the second color component using a convolutional neural network filter.

Clause 57: The device of clause 55, wherein the means for filtering the concatenated color components comprises means for filtering the concatenated color components using a convolutional neural network filter.

Clause 58: A method of filtering decoded video data, the method comprising: applying a downsampling convolutional neural network layer to a first color component of a block of video data, the first color component of the block having a first size, wherein applying the downsampling convolutional neural network layer to the first color component generates a downsampled first color component having a second size smaller than the first size; filtering a second color component having the second size to form a filtered second color component; concatenating the downsampled first color component with the filtered second color component to form concatenated color components; and filtering the concatenated color components.

Clause 59: The method of clause 58, further comprising upsampling the filtered downsampled first color component to the first size.

Clause 60: The method of clause 58, further comprising combining two or more filtered downsampled blocks of the first color component, including the filtered downsampled block, to generate an upsampled first color component having the first size.

Clause 61: The method of clause 60, wherein the first size comprises 2N×2N, and wherein the two or more filtered downsampled blocks of the first color component comprise four N×N filtered downsampled blocks of the first color component.

Clause 62: The method of any of clauses 58-61, wherein the downsampling convolutional neural network layer comprises a 3×3×M convolutional neural network layer filter with a stride of 2.

Clause 63: The method of any of clauses 58-62, wherein the one or more convolutional neural network layer filters comprises a residual processing unit.

Clause 64: The method of clause 63, wherein the residual processing unit comprises a first 3×3×K×K convolution layer, a PReLU layer, and a second 3×3×K×K convolution layer.

Clause 65: The method of any of clauses 58-64, further comprising filtering a third color component of the block of video data using the one or more convolutional neural network layer filters.

Clause 66: The method of clause 65, wherein the second size comprises the smaller of a size of the second color component or a size of the third color component.

Clause 67: The method of any of clauses 58-66, wherein the first color component comprises a luminance component, and wherein the second color component comprises one of a blue hue chrominance component or a red hue chroma chrominance component.

Clause 68: The method of any of clauses 58-67, wherein filtering the second color component comprises filtering the second color component using a convolutional neural network filter.

Clause 69: The method of any of clauses 58-68, wherein filtering the concatenated color components comprises filtering the concatenated color components using a convolutional neural network filter.

Clause 70: A device for decoding video data, the device comprising: a memory configured to store video data; and one or more processors implemented in circuitry and configured to: apply a downsampling convolutional neural network layer to a first color component of a block of video data, the first color component of the block having a first size, wherein applying the downsampling convolutional neural network layer to the first color component generates a downsampled first color component having a second size smaller than the first size; filter a second color component having the second size to form a filtered second color component; concatenate the downsampled first color component with the filtered second color component to form concatenated color components; and filter the concatenated color components.

Clause 71: The device of clause 70, wherein the one or more processors are further configured to upsample the filtered downsampled first color component to the first size.

Clause 72: The device of clause 70, wherein the one or more processors are further configured to combine two or more filtered downsampled blocks of the first color component, including the filtered downsampled block, to generate an upsampled first color component having the first size.

Clause 73: The device of clause 72, wherein the first size comprises 2N×2N, and wherein the two or more filtered downsampled blocks of the first color component comprise four N×N filtered downsampled blocks of the first color component.

Clause 74: The device of any of clauses 70-73, wherein the downsampling convolutional neural network layer comprises a 3×3×M convolutional neural network layer filter with a stride of 2.

Clause 75: The device of any of clauses 70-74, wherein the one or more convolutional neural network layer filters comprise a residual processing unit.

Clause 76: The device of clause 75, wherein the residual processing unit comprises a first 3×3×K×K convolution layer, a PReLU layer, and a second 3×3×K×K convolution layer.

Clause 77: The device of any of clauses 70-76, wherein the one or more processors are further configured to filter a third color component of the block of video data using the one or more convolutional neural network layer filters.

Clause 78: The device of clause 77, wherein the second size comprises the smaller of a size of the second color component or a size of the third color component.

Clause 79: The device of any of clauses 70-78, wherein the first color component comprises a luminance component, and wherein the second color component comprises one of a blue hue chrominance component or a red hue chroma chrominance component.

Clause 80: The device of any of clauses 70-79, wherein the one or more processors are configured to filter the second color component using a convolutional neural network filter.

Clause 81: The device of any of clauses 70-80, wherein the one or more processors are configured to filter the concatenated color components using a convolutional neural network filter.

Clause 82: The device of any of clauses 70-81, further comprising a display configured to display video data corresponding to the concatenated color components.

Clause 83: The device of any of clauses 70-82, wherein the device comprises one or more of a camera, a computer, a mobile device, a broadcast receiver device, or a set-top box.

Clause 84: A computer-readable storage medium having stored thereon instructions that, when executed, cause a processor to: apply a downsampling convolutional neural network layer to a first color component of a block of video data, the first color component of the block having a first size, wherein applying the downsampling convolutional neural network layer to the first color component generates a downsampled first color component having a second size smaller than the first size; filter a second color component having the second size to form a filtered second color component; concatenate the downsampled first color component with the filtered second color component to form concatenated color components; and filter the concatenated color components.

Clause 85: The computer-readable storage medium of clause 84, further comprising instructions that cause the processor to upsample the filtered downsampled first color component to the first size.

Clause 86: The computer-readable storage medium of clause 84, further comprising instructions that cause the processor to combine two or more filtered downsampled blocks of the first color component, including the filtered downsampled block, to generate an upsampled first color component having the first size.

Clause 87: The computer-readable storage medium of clause 86, wherein the first size comprises 2N×2N, and wherein the two or more filtered downsampled blocks of the first color component comprise four N×N filtered downsampled blocks of the first color component.

Clause 88: The computer-readable storage medium of any of clauses 84-87, wherein the downsampling convolutional neural network layer comprises a 3×3×M convolutional neural network layer filter with a stride of 2.

Clause 89: The computer-readable storage medium of any of clauses 84-88, wherein the one or more convolutional neural network layer filters comprise a first 3×3×K×K convolution layer, a PReLU layer, and a second 3×3×K×K convolution layer.

Clause 90: The computer-readable storage medium of any of clauses 84-89, wherein the one or more processors are further configured to filter a third color component of the block of video data using the one or more convolutional neural network layer filters.

Clause 91: The computer-readable storage medium of clause 90, wherein the second size comprises the smaller of a size of the second color component or a size of the third color component.

Clause 92: The computer-readable storage medium of any of clauses 84-91, wherein the first color component comprises a luminance component, and wherein the second color component comprises one of a blue hue chrominance component or a red hue chroma chrominance component.

Clause 93: The computer-readable storage medium of any of clauses 84-92, wherein the instructions that cause the processor to filter the second color component comprise instructions that cause the processor to filter the second color component using a convolutional neural network filter.

Clause 94: The computer-readable storage medium of any of clauses 84-93, wherein the instructions that cause the processor to filter the second color component comprise instructions that cause the processor to filter the concatenated color components using a convolutional neural network filter.

Clause 95: A device for filtering decoded video data, the device comprising: means for applying a downsampling convolutional neural network layer to a first color component of a block of video data, the first color component of the block having a first size, wherein applying the downsampling convolutional neural network layer to the first color component generates a downsampled first color component having a second size smaller than the first size; means for filtering a second color component having the second size to form a filtered second color component; means for concatenating the downsampled first color component with the filtered second color component to form concatenated color components; and means for filtering the concatenated color components.

Clause 96: The device of clause 95, wherein the means for filtering the second color component comprises means for filtering the second color component using a convolutional neural network filter.

Clause 97: The device of any of clauses 95 and 96, wherein the means for filtering the concatenated color components comprises means for filtering the concatenated color components using a convolutional neural network filter.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering decoded video data, the method comprising:
    applying a downsampling first convolutional neural network layer to a first color component of a block of video data, the first color component of the block having a first size, wherein applying the downsampling convolutional neural network layer to the first color component generates a downsampled first color component having a second size smaller than the first size;
    filtering a second color component having the second size to form a filtered second color component using a second convolutional neural network layer, the second convolutional neural network layer layer being different from the first convolutional neural network layer;
    wherein the first color component is a luminance component, and wherein the second color component is one of a blue hue chrominance component or a red hue chroma chrominance component;
    concatenating the downsampled first color component with the filtered second color component to form concatenated color components; and
    filtering the concatenated color components to form a filtered concatenated component including a filtered downsampled first color component using at least a third convolutional neural network layer.

2. The method of claim 1, further comprising upsampling the filtered downsampled first color component to the first size.

3. The method of claim 1, further comprising combining two or more filtered downsampled blocks of the first color component, including the filtered downsampled first color component, to generate an upsampled first color component having the first size.

4. The method of claim 3, wherein the first size comprises 2N×2N, and wherein the two or more filtered downsampled first color components of the first color component comprise four N×N filtered downsampled blocks of the first color component.

5. The method of claim 1, wherein the downsampling convolutional neural network layer comprises a 3×3×M convolutional neural network layer filter with a stride of 2.

6. The method of claim 1, wherein the convolutional neural network layer comprises a residual processing unit.

7. The method of claim 6, wherein the residual processing unit comprises a first 3×3×K×K convolution layer, a PReLU layer, and a second 3×3×K×K convolution layer.

8. The method of claim 1, further comprising filtering a third color component of the block of video data using the convolutional neural network layer.

9. The method of claim 8, wherein the second size comprises the smaller of a size of the second color component or a size of the third color component.

10. A device for decoding video data, the device comprising:
    a memory configured to store video data; and
    one or more processors implemented in circuitry and configured to:
        apply a downsampling first convolutional neural network layer to a first color component of a block of video data, the first color component of the block having a first size, wherein applying the downsampling convolutional neural network layer to the first color component generates a downsampled first color component having a second size smaller than the first size;
        filter a second color component having the second size to form a filtered second color component using a second convolutional neural network layer, the second convolutional neural network layer layer being different from the first convolutional neural network layer;
        wherein the first color component is a luminance component, and wherein the second color component is one of a blue hue chrominance component or a red hue chroma chrominance component;
        concatenate the downsampled first color component with the filtered second color component to form concatenated color components; and
        filter the concatenated color components to form a concatenated color component including a filtered downsampled first color component using at least a third convolutional neural network layer.

11. The device of claim 10, wherein the one or more processors are further configured to upsample the filtered downsampled first color component to the first size.

12. The device of claim 10, wherein the one or more processors are further configured to combine two or more filtered downsampled blocks of the first color components, including the filtered downsampled first color component, to generate an upsampled first color component having the first size.

13. The device of claim 12, wherein the first size comprises 2N×2N, and wherein the two or more filtered downsampled blocks of the first color component comprise four N×N filtered downsampled blocks of the first color component.

14. The device of claim 10, wherein the downsampling convolutional neural network layer comprises a 3×3×M convolutional neural network layer filter with a stride of 2.

15. The device of claim 10, wherein the convolutional neural network layer comprise a residual processing unit.

16. The device of claim 15, wherein the residual processing unit comprises a first 3×3×K×K convolution layer, a PReLU layer, and a second 3×3×K×K convolution layer.

17. The device of claim 10, wherein the one or more processors are further configured to filter a third color component of the block of video data using the convolutional neural network layer.

18. The device of claim 17, wherein the second size comprises the smaller of a size of the second color component or a size of the third color component.

19. The device of claim 10, further comprising a display configured to display video data corresponding to the concatenated color components.

20. The device of claim 10, wherein the device comprises one or more of a camera, a computer, a mobile device, a broadcast receiver device, or a set-top box.

21. A non-transitory computer-readable storage medium having stored thereon instructions that, when executed, cause a processor to:
- apply a downsampling first convolutional neural network layer to a first color component of a block of video data, the first color component of the block having a first size, wherein applying the downsampling convolutional neural network layer to the first color component generates a downsampled first color component having a second size smaller than the first size;
- filter a second color component having the second size to form a filtered second color component using a second convolutional neural network layer, the second convolutional neural network layer layer being different from the first convolutional neural network layer;
- wherein the first color component is a luminance component, and wherein the second color component is one of a blue hue chrominance component or a red hue chroma chrominance component;
- concatenate the downsampled first color component with the filtered second color component to form concatenated color components; and
- filter the concatenated color components to form a filtered concatenated component including a filtered downsampled first color component using at least a third convolutional neural network layer.

22. The computer-readable storage medium of claim 21, further comprising instructions that cause the processor to upsample the filtered downsampled first color component to the first size.

23. The computer-readable storage medium of claim 21, further comprising instructions that cause the processor to combine two or more filtered downsampled blocks of the first color component, including the filtered downsampled first color component, to generate an upsampled first color component having the first size.

24. The computer-readable storage medium of claim 23, wherein the first size comprises 2N×2N, and wherein the two or more filtered downsampled blocks of the first color component comprise four N×N filtered downsampled blocks of the first color component.

25. The computer-readable storage medium of claim 21, wherein the downsampling convolutional neural network layer comprises a 3×3×M convolutional neural network layer filter with a stride of 2.

26. The computer-readable storage medium of claim 21, wherein the convolutional neural network layer comprises a first 3×3×K×K convolution layer, a PReLU layer, and a second 3×3×K×K convolution layer.

27. The computer-readable storage medium of claim 21, further comprising instructions that cause the processor to filter a third color component of the block of video data using the convolutional neural network layer.

28. The computer-readable storage medium of claim 27, wherein the second size comprises the smaller of a size of the second color component or a size of the third color component.

29. A device for filtering decoded video data, the device comprising:
- means for applying a downsampling first convolutional neural network layer to a first color component of a block of video data, the first color component of the block having a first size, wherein applying the downsampling convolutional neural network layer to the first color component generates a downsampled first color component having a second size smaller than the first size;
- means for filtering a second color component having the second size to form a filtered second color component using a second convolutional neural network layer, the second convolutional neural network layer layer being different from the first convolutional neural network layer;
- wherein the first color component is a luminance component, and wherein the second color component is one of a blue hue chrominance component or a red hue chroma chrominance component;
- means for concatenating the downsampled first color component with the filtered second color component to form concatenated color components; and
- means for filtering the concatenated color components using at least a third convolutional neural network layer.

* * * * *